(12) United States Patent
Jeromin et al.

(10) Patent No.: US 8,924,078 B2
(45) Date of Patent: Dec. 30, 2014

(54) IMAGE ACQUISITION AND PROCESSING SYSTEM FOR VEHICLE EQUIPMENT CONTROL

(75) Inventors: Oliver M. Jeromin, Holland, MI (US); Steven M. Currie, Grand Haven, MI (US); Gregory S. Bush, Grand Rapids, MI (US); Eric J. Walstra, Grand Rapids, MI (US); Joseph S. Stam, Holland, MI (US); Timothy S. Cornell, Beaverton, OR (US)

(73) Assignee: Gentex Corporation, Zeeland, MI (US)

( * ) Notice: Subject to any disclaimer, the term of this patent is extended or adjusted under 35 U.S.C. 154(b) by 369 days.

(21) Appl. No.: 13/274,808

(22) Filed: Oct. 17, 2011

(65) Prior Publication Data
US 2012/0072080 A1    Mar. 22, 2012

Related U.S. Application Data

(63) Continuation-in-part of application No. 13/017,764, filed on Jan. 31, 2011, now Pat. No. 8,065,053, which
(Continued)

(51) Int. Cl.
| G06F 7/00 | (2006.01) |
| G06K 9/20 | (2006.01) |
| G06T 7/00 | (2006.01) |
| G08G 1/16 | (2006.01) |
| B60Q 9/00 | (2006.01) |
| B60Q 1/14 | (2006.01) |
| G06K 9/00 | (2006.01) |

(52) U.S. Cl.
CPC ...... *G08G 1/167* (2013.01); *G06T 2207/20148* (2013.01); *G06K 9/2018* (2013.01); *G06T 7/0085* (2013.01); *G06T 2207/30256* (2013.01); *B60Q 9/008* (2013.01); *B60Q 1/143* (2013.01); *G06K 9/00798* (2013.01)

USPC ............................. 701/36; 340/901; 382/173

(58) Field of Classification Search
USPC .......... 701/26, 36, 38; 340/42, 148, 307, 461, 340/435, 901, 903, 469, 939; 348/36, 348/E13.007, E13.015, E13.026, E7.085, 348/E9.002; 359/462.1, 462.11, 462.41; 381/86, 87, 122, 345, 389; 455/41.2, 455/569.2; 382/173; 250/208.1

See application file for complete search history.

(56) References Cited

U.S. PATENT DOCUMENTS

| 2,632,040 A | 3/1953 | Rabinow |
| 2,827,594 A | 3/1958 | Rabinow |

(Continued)

FOREIGN PATENT DOCUMENTS

| DE | 2946561 | 5/1981 |
| FR | 2641237 | 7/1990 |

(Continued)

*Primary Examiner* — Khoi Tran
*Assistant Examiner* — Jaime Figueroa
(74) *Attorney, Agent, or Firm* — Price Heneveld LLP; Scott P. Ryan

(57) ABSTRACT

An image acquisition and processing system includes an image sensor and one or more processors that are configured to receive at least a portion of at least one image from the image sensor. The dynamic aim of the image sensor is configured as a function of at least one feature extracted from at least a portion of an image. To accomplish the task, the system utilizes a series of adaptive thresholds used in parallel comparators to determine whether or not a pixel in a given image scene falls on the edge of a given lane line on a road. The location of the lane lines are then used to determine the scene vanishing point, which ideally will be co-located at the optical scene center. If they are not in agreement, the pixel data set being processed can be adjusted to accommodate for any disagreement.

21 Claims, 14 Drawing Sheets

Related U.S. Application Data is a continuation of application No. 11/273,098, filed on Nov. 14, 2005, now Pat. No. 7,881,839.

(60) Provisional application No. 60/710,602, filed on Aug. 23, 2005, provisional application No. 60/710,315, filed on Sep. 8, 2005, provisional application No. 60/629,108, filed on Nov. 18, 2004.

(56) References Cited

U.S. PATENT DOCUMENTS

| | | |
|---|---|---|
| 4,139,801 A | 2/1979 | Linares |
| 4,236,099 A | 11/1980 | Rosenblum |
| 4,357,558 A | 11/1982 | Massoni et al. |
| 4,376,909 A | 3/1983 | Tagami et al. |
| 4,599,544 A | 7/1986 | Martin |
| 4,665,321 A | 5/1987 | Chang et al. |
| 4,692,798 A | 9/1987 | Seko et al. |
| 4,727,290 A | 2/1988 | Smith et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,930,742 A | 6/1990 | Schofield et al. |
| 4,967,319 A | 10/1990 | Seko |
| 5,036,437 A | 7/1991 | Macks |
| 5,072,154 A | 12/1991 | Chen |
| 5,086,253 A | 2/1992 | Lawler |
| 5,124,549 A | 6/1992 | Michaels et al. |
| 5,182,502 A | 1/1993 | Slotkowski et al. |
| 5,187,383 A | 2/1993 | Taccetta et al. |
| 5,235,178 A | 8/1993 | Hegyi |
| 5,329,206 A | 7/1994 | Slotkowski et al. |
| 5,416,318 A | 5/1995 | Hegyi |
| 5,426,294 A | 6/1995 | Kobayashi et al. |
| 5,434,407 A | 7/1995 | Bauer et al. |
| 5,451,822 A | 9/1995 | Bechtel et al. |
| 5,471,515 A | 11/1995 | Fossum et al. |
| 5,508,592 A | 4/1996 | Lapatovich et al. |
| 5,537,003 A | 7/1996 | Bechtel et al. |
| 5,550,677 A | 8/1996 | Schofield et al. |
| 5,614,788 A | 3/1997 | Mullins et al. |
| 5,660,454 A | 8/1997 | Mori et al. |
| 5,666,028 A | 9/1997 | Bechtel et al. |
| 5,715,093 A | 2/1998 | Schierbeek et al. |
| 5,796,094 A * | 8/1998 | Schofield et al. .......... 250/208.1 |
| 5,811,888 A | 9/1998 | Hsieh |
| 5,812,321 A | 9/1998 | Schierbeek et al. |
| 5,837,994 A | 11/1998 | Stam et al. |
| 5,841,126 A | 11/1998 | Fossum et al. |
| 5,912,534 A | 6/1999 | Benedict |
| 5,923,027 A | 7/1999 | Stam et al. |
| 5,942,853 A | 8/1999 | Piscart |
| 5,990,469 A | 11/1999 | Bechtel et al. |
| 6,008,486 A | 12/1999 | Stam et al. |
| 6,049,171 A * | 4/2000 | Stam et al. ...................... 315/82 |
| 6,097,023 A | 8/2000 | Schofield et al. |
| 6,130,421 A | 10/2000 | Bechtel et al. |
| 6,144,158 A | 11/2000 | Beam |
| 6,396,397 B1 | 5/2002 | Bos et al. |
| 6,559,435 B2 | 5/2003 | Schofield et al. |
| 6,928,180 B2 | 8/2005 | Stam et al. |
| 6,975,215 B2 | 12/2005 | Schofield et al. |
| 7,038,577 B2 | 5/2006 | Pawlicki et al. |
| 7,164,117 B2 | 1/2007 | Breed et al. |
| 7,417,221 B2 | 8/2008 | Creswick et al. |
| 7,881,496 B2 * | 2/2011 | Camilleri et al. ............. 382/104 |
| 7,899,213 B2 * | 3/2011 | Otsuka et al. ................. 382/104 |
| 2002/0040962 A1 | 4/2002 | Schofield et al. |
| 2002/0095246 A1 | 7/2002 | Kawazoe |
| 2003/0002690 A1 | 1/2003 | Breed et al. |
| 2003/0058346 A1 | 3/2003 | Bechtel et al. |
| 2003/0122939 A1 * | 7/2003 | Bell et al. .................... 348/229.1 |
| 2003/0123706 A1 | 7/2003 | Stam et al. |
| 2004/0143380 A1 | 7/2004 | Stam et al. |
| 2004/0201483 A1 * | 10/2004 | Stam et al. ...................... 340/600 |
| 2004/0246607 A1 | 12/2004 | Watson et al. |
| 2005/0060069 A1 * | 3/2005 | Breed et al. ...................... 701/29 |
| 2005/0187675 A1 | 8/2005 | Schofield et al. |
| 2006/0016965 A1 | 1/2006 | Stam et al. |
| 2006/0125919 A1 * | 6/2006 | Camilleri et al. ............. 348/148 |
| 2006/0206243 A1 * | 9/2006 | Pawlicki et al. .................. 701/1 |
| 2006/0215882 A1 * | 9/2006 | Ando et al. .................... 382/106 |
| 2007/0291383 A1 | 12/2007 | Watson et al. |
| 2008/0037803 A1 | 2/2008 | Breed |
| 2008/0122591 A1 | 5/2008 | Schofield et al. |
| 2008/0144944 A1 * | 6/2008 | Breed ........................... 382/224 |
| 2009/0010494 A1 | 1/2009 | Bechtel et al. |
| 2009/0240397 A1 | 9/2009 | Schofield et al. |
| 2010/0002081 A1 * | 1/2010 | Pawlicki et al. ............... 348/148 |
| 2010/0053320 A1 * | 3/2010 | Chen et al. .................... 348/135 |
| 2011/0285849 A1 * | 11/2011 | Schofield et al. ............. 348/148 |

FOREIGN PATENT DOCUMENTS

| | | |
|---|---|---|
| FR | 2726144 | 4/1996 |
| JP | 8166221 | 6/1996 |
| JP | 2000048183 | 2/2000 |
| WO | 86/05147 | 9/1986 |
| WO | 97/35743 | 10/1997 |
| WO | 98/43850 | 10/1998 |
| WO | 99/47396 | 9/1999 |
| WO | 00/22881 | 4/2000 |

\* cited by examiner

IMAGE ACQUISITION AND PROCESSING SYSTEM FOR VEHICLE EQUIPMENT CONTROL

CROSS REFERENCE TO RELATED APPLICATIONS

This application is a continuation-in-part under 35 U.S.C. §120 of U.S. patent application Ser. No. 13/017,764, filed on Jan. 31, 2011, entitled "IMPROVED IMAGE ACQUISITION AND PROCESSING SYSTEMS FOR VEHICLE EQUIPMENT CONTROL" which is a continuation of U.S. patent application Ser. No. 11/273,098, filed on Nov. 14, 2005, entitled "IMAGE ACQUISITION AND PROCESSING SYSTEMS FOR VEHICLE EQUIPMENT CONTROL" and assigned to Gentex Corporation, which claims the benefit under 35 U.S.C. §119(e) of U.S. Provisional Patent Application Ser. No. 60/715,315, entitled "IMPROVED IMAGE PROCESSING SYSTEM FOR VEHICLE EQUIPMENT CONTROL AND VARIOUS VEHICLE EQUIPMENT CONTROL SYSTEMS," which was filed Sep. 8, 2005; U.S. Provisional Patent Application Ser. No. 60/710,602, entitled "IMPROVED IMAGE ACQUISITION AND PROCESSING SYSTEM FOR VEHICLE EQUIPMENT CONTROL," which was filed Aug. 23, 2005; and U.S. Provisional Patent Application Ser. No. 60/629,108, entitled "IMPROVED IMAGE PROCESSING SYSTEM FOR VEHICLE EQUIPMENT CONTROL," which was filed Nov. 18, 2004, the disclosures of which are all incorporated in their entirety herein by reference.

BACKGROUND OF THE INVENTION

Vision systems are commonly used within vehicles for automatic control and monitoring of vehicle equipment. More specially, a camera is integrated into an auto-dimming mirror and combined with algorithmic decision making processing to automatically operate vehicle high beam headlamps in order to optimize their usage according to surrounding traffic conditions. In order for the vision system to operate properly, it is important that the camera used in the vision system to be accurately aligned. To ensure that the camera is accurately aligned, auto aiming algorithms constantly measure and correct imager misalignment over time. There are generally two types of auto aiming algorithms, viz. tail light aim and lane line aim. Both types of aim algorithms use weighted averaging to help reduce outlier data points and more accurately converge on a center point of the camera.

In use, if a vehicle windshield angle is different from the calibrated center point, then a "windshield offset" value is used to initially adjust the vertical center point calibrating the vision system camera in the vehicle. Although alignment often occurs during the manufacture of the vehicle, while it is in operation, the vision system must even more accurately align the camera especially in the horizontal plane. Accordingly, new systems and processes are required to insure that the system provides only the most accurate information to the headlight control so the driver has the best vision available for current road and environmental conditions.

The present invention provides improvements in vehicle vision system components, vehicle vision systems and vehicle equipment control systems employing the vision system components and vision systems.

DETAIL DESCRIPTION OF THE INVENTION

Figure 1:
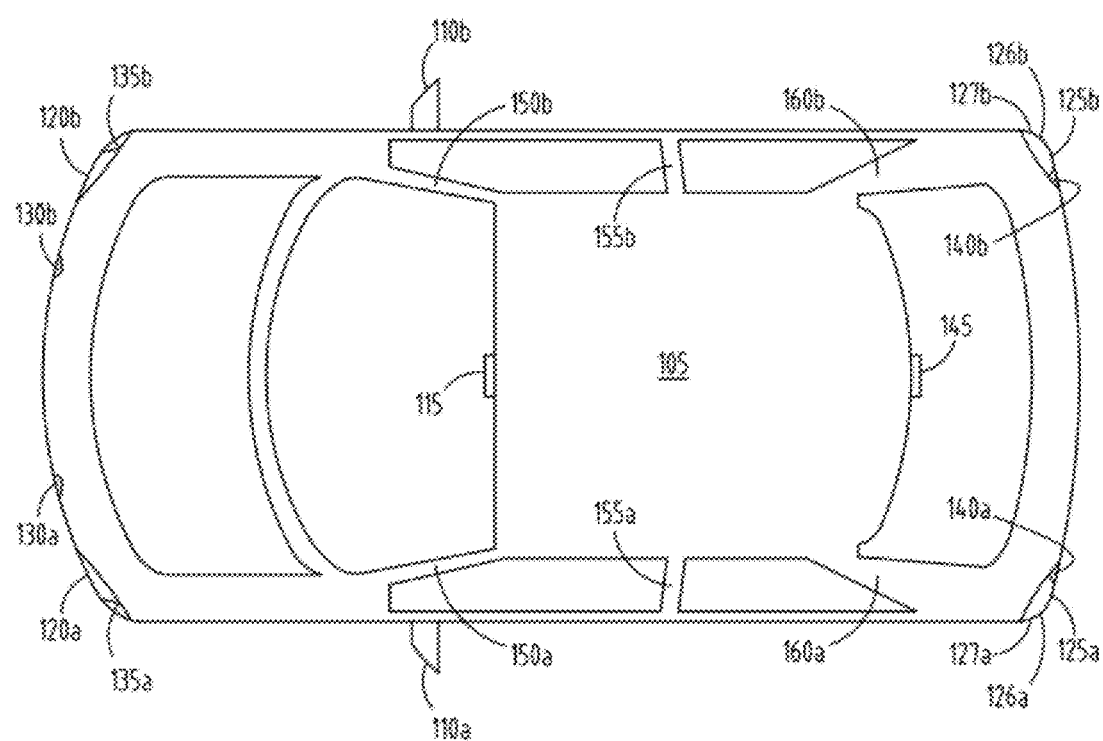
FIG. 1 depicts a plan view of a controlled vehicle.

Before describing in detail embodiments that are in accordance with the present invention, it should be observed that the embodiments reside primarily in combinations of method steps and apparatus components related to an image processing and acquisition system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of an image acquisition and processing system described herein. The non-processor circuits may include, but are not limited to, signal drivers, clock circuits, power source circuits, and user input devices. As such, these functions may be interpreted as steps of a method to perform an image acquisition and processing system.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Many vehicle equipment control systems have been proposed that incorporate imaging systems and related processors. In at least one embodiment described herein a single imaging system is provided to facilitate multiple vehicle system functionality. In at least one embodiment, multiple imaging systems are provided to individually serve multiple or singular applications.

Vehicle exterior light control systems using a camera and image processing system have been developed and disclosed in commonly assigned U.S. Pat. Nos. 5,837,994, 5,990,469, 6,008,486, 6,130,448, 6,130,421, 6,049,171, 6,465,963, 6,403,942, 6,587,573, 6,611,610, 6,621,616, 6,631,316 and U.S. patent application Ser. Nos. 10/208,142, 09/799,310, 60/404,879, 60/394,583, 10/235,476, 10/783,431, 10/777,468, 09/800,460 and 60/590,736; the disclosures of which are incorporated herein in their entireties by reference. In these systems, images are acquired of the view forward a motor vehicle. In at least one embodiment, an image sensor is optically coupled to the interior surface of the windshield such that reflections and, or, refraction from the interior windshield surface is substantially eliminated. These images are processed to determine the presence or absence of oncoming or preceding vehicles and the controlled vehicles exterior lights are adjusted, for example by turning off the high beams, to prevent glare to the drivers of other vehicles.

Moisture sensing, windshield wiper and HVAC controls are described in commonly assigned U.S. Pat. Nos. 5,923,027 and 6,617,566 as well as U.S. patent application Ser. Nos. 09/970,728 and 60/472,017, the entire disclosures of which are incorporated herein by reference.

With reference to FIG. 1, a controlled vehicle 105 may comprise a variety of exterior lights, such as, headlight assemblies 120a, 120b, foul conditions lights 130a, 130b, front turn signal indicators 135a, 135b, taillight assembly 125a, 125b, rear turn signal indicators 126a, 126b, rear emergency flashers 127a, 127b, backup lights 140a, 140b and center high mounted stop light (CHMSL) 145.

As described in detail herein, the controlled vehicle may comprise at least one control system incorporating various components that provide shared function with other vehicle equipment. An example of one control system described herein integrates various components associated with automatic control of the reflectivity of at least one rearview mirror element and automatic control of at least one exterior light. Such systems 115 may comprise at least one image sensor within a rearview mirror, an A-pillar 150a, 150b, a B-pillar 155a, 155b, a C-pillar 160a, 160b, a CHMSL or elsewhere within or upon the controlled vehicle. Images acquired, or portions thereof, may be used for automatic vehicle equipment control. The images, or portions thereof, may alternatively, or additionally, be displayed on one or more displays. At least one display may be covertly positioned behind a transflective, or at least partially transmissive, electro-optic element. A common controller may be configured to generate at least one mirror element drive signal and at least one other equipment control signal.

Figure 2:
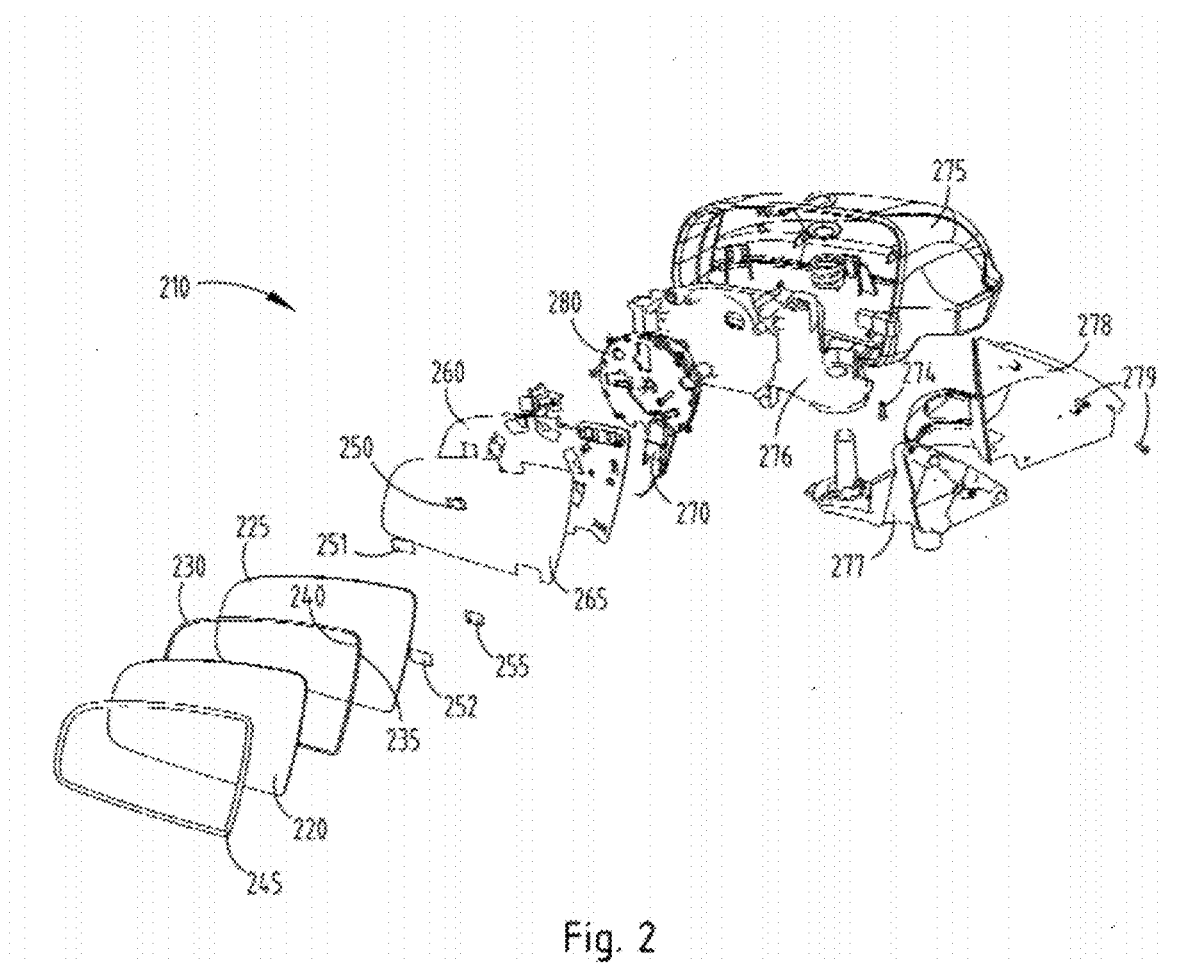
FIG. 2 depicts an exploded, perspective, view of an exterior rearview mirror assembly.

Turning now to FIG. 2, various components of an outside rearview mirror assembly 210 are depicted. In at least one embodiment, an electro-optic mirror element is provided that comprises a first substrate 220 having at least one conductive/reflective coating on an inward facing surface secured in a spaced apart relationship with a second substrate 225 having at least one conductive/reflective coating on an inward facing surface via a primary seal 230 to form a chamber therebetween. In at least one embodiment at least a portion of the primary seal is left void to form at least one chamber fill port 235. An electro-optic medium is enclosed in the chamber and the fill port(s) is sealingly closed via a plug material 240. Preferably, the plug material is a UV curable epoxy or acrylic material. Also shown is a spectral filter material 245 located near the periphery of the element. Electrical clips 250, 255 are preferably secured to the element, respectively, via first adhesive material 251, 252. The element is secured to a carrier plate 260 via second adhesive material 265. Electrical connections from the outside rearview mirror to other components of the controlled vehicle are preferably made via a connecter 270. The carrier is attached to an associated housing mount 276 via a positioner 280. Preferably, the housing mount is engaged with a housing 275 and secured via at least one fastener 277. Preferably, the housing mount comprises a swivel portion configured to engage a swivel mount 277. The swivel mount is preferably configured to engage a vehicle mount 278 via at least one fastener 279. Additional details of these components, additional components, their interconnections and operation are provided herein.

Figure 3:
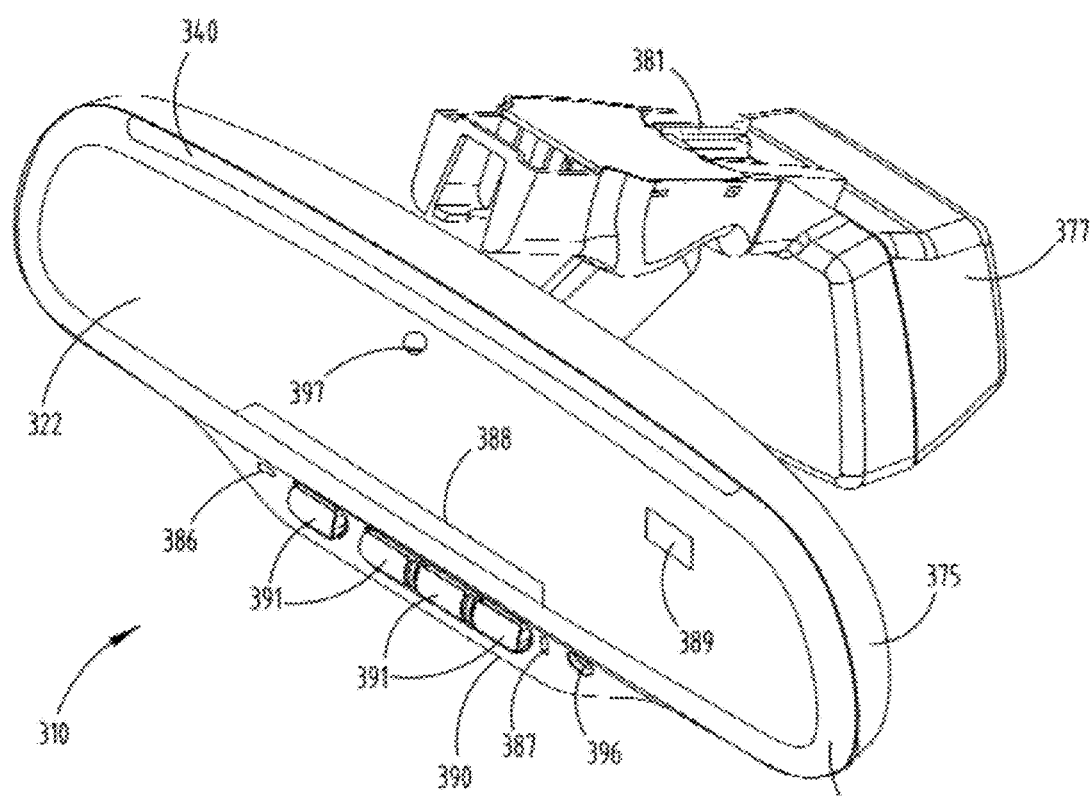
FIG. 3 depicts a perspective view of an interior rearview mirror assembly.

Turning now to FIG. 3, there is shown an inside rearview mirror assembly 310 as viewed looking at the first substrate 322 with a spectral filter material 345 positioned between the viewer and a primary seal material (not shown). The mirror element is shown to be positioned within a movable housing 375 and combined with a stationary housing 377 on a mounting structure 381. A first indicator 386, a second indicator 387, operator interfaces 391 and a first photo sensor 396 are positioned in a chin portion 390 of the movable housing. A first information display 388, a second information display 389 and a second photo sensor 397 are incorporated within the assembly such that they are behind the element with respect to the viewer. As described with regard to the outside rearview mirror assembly, it is preferable to have devices 388, 389, 397 at least partially covert.

In preferred embodiments of such systems, lights from other vehicles and non-vehicular objects are identified by locating peak points of brightness in the image. Once located, various properties of these bright points, such as the brightness, color, position, width, height, and motion are determined. The values of these parameters are analyzed using statistical methods to determine if the bright points correspond to the headlamps or tail lamps of other vehicles, or to non-vehicular light sources such as signs, reflectors, or other stationary lights. A significant challenge in the development of the image processing algorithms for vehicular lighting control is properly classifying the peak points in the image. Failure to correctly identify a light source may result in glare to the other vehicles or shutting off of the high beams at inappropriate times resulting in controlled vehicle driver dissatisfaction.

The inventors have determined that the position of the bright point in the image is an extremely significant variable in the classification of the object. Peak points located in the center of the image are more likely to correspond to vehicular light sources while sources off to the side are more likely to correspond to signs or reflectors (other factors such as color, brightness, and motion are preferably simultaneously considered). The inventors are also aware from experience that the manufacturing of the camera and physical mounting of a camera in a vehicle is subject to variation. Thus, the actual center of the image may not be known with high precision. To alleviate these problems, factory aim calibration is preferably utilized to establish the center of the image in the vehicle assembly plant. Automatic continuous aim calibration is also utilized as described in the aforementioned prior art.

While these aim methods are highly effective in establishing the appropriate image center calibration, there are limitations that the current invention overcomes. An apparatus similar to one utilized for headlamp aiming is preferably employed in the assembly plant. An illumination source is positioned in a predetermined position in front of each vehicle and at least one image is acquired. At least one image is analyzed to determine if the image sensor aim is acceptable.

In at least one embodiment, the present invention improves aiming methods by establishing an image aim calibration which occurs with every image cycle or with only a small number of cycles. Thus, the present invention is able to adapt very quickly to changes in road conditions and establish the position of the center of the road in the image and thus determine the position of identified bright peaks in the image relative to the road. This information can be used to better classify the identified peaks and results in improved performance and the potential elimination of the need for factory aim.

In at least one embodiment of the present invention, the painted road lane markers are identified to locate the position of the road. The intersection of the left and right lane in the image indicates the center of the road. Lane departure warning systems are commercially available on vehicles which identify lane markers and warn drivers who make lane changes without signaling. Some of these systems use an image sensor and image processing means to identify these lanes. The algorithms used in these systems may be used with an exterior light control system to identify the lanes for the purpose of aiming the exterior light control system rather than, or in addition, to the lane departure warning function. A separate lane departure warning system may be equipped with a means to communicate the lane positions to the exterior light control system for the purpose of determining the road position for the exterior light control system.

Figure 4:
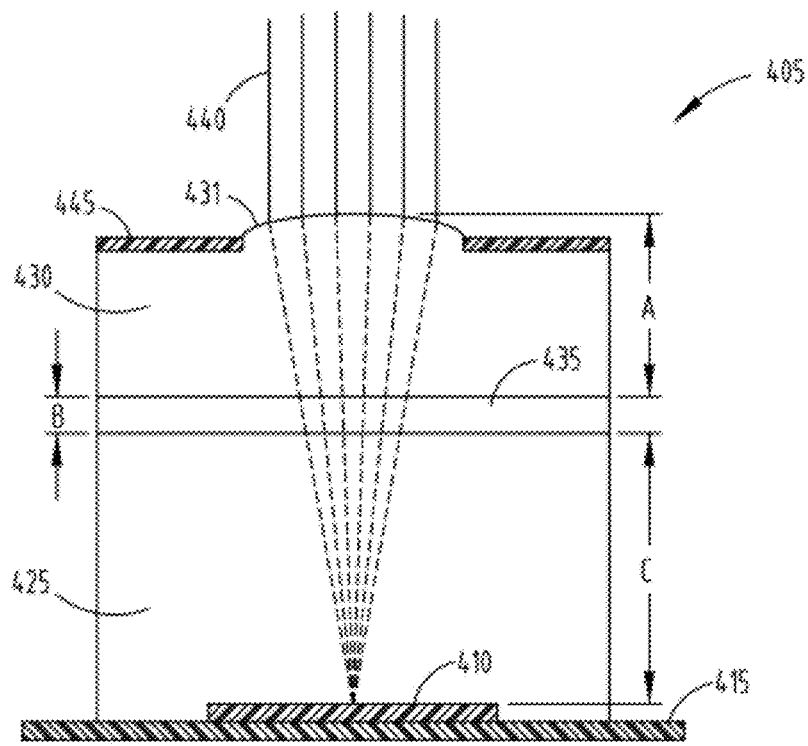
FIG. 4 depicts a sectional, profile, view of an image sensor.
Figure 5:
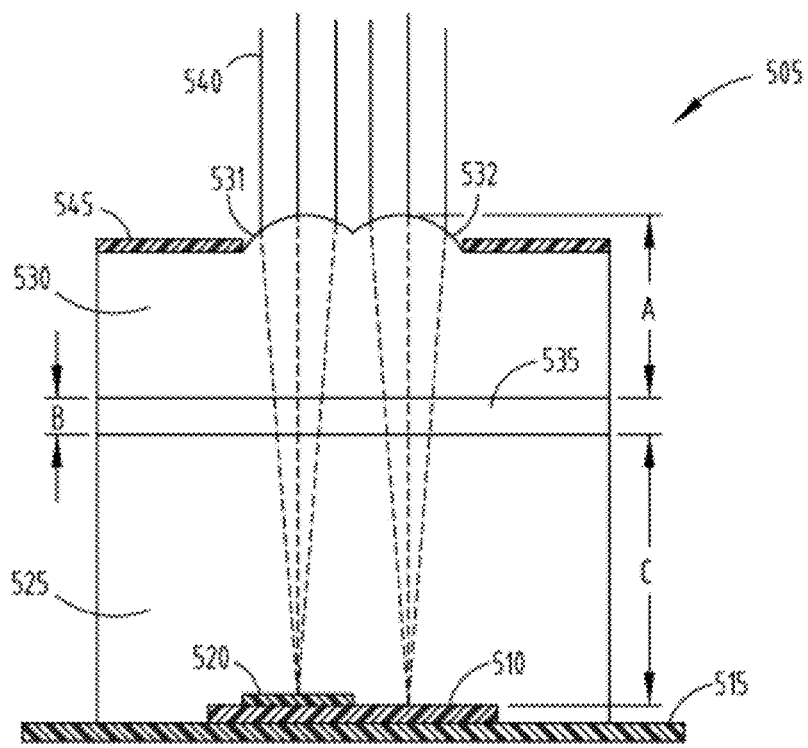
FIG. 5 depicts a sectional, profile, view of an image sensor.

A simple lane tracking algorithm is now presented which has been determined to be effective for lane identification for the purpose described herein. For this example, the imaging system may be configured as described in FIG. 4 or 5. As depicted in FIG. 4, the imaging system 405 comprises an image sensor 410 mounted to a circuit board 415. The image sensor is encapsulated in a material 425 to form a lens assembly 430 mount. The lens assembly comprises a first lens 431 configured for focusing light rays 440 from a scene upon the image sensor. The imaging system further comprises a mask 445 configured to form an aperture around the first lens. The overall image sensor resolution is 144×176 pixels. As depicted in FIG. 5, the imaging system 505 comprises an image sensor 510 mounted to a circuit board 515 with a spectral filter material 520 disposed over approximately one half of the associated pixels. The image sensor is encapsulated in a material 525 to form a lens assembly 530 mount. The lens assembly comprises a first lens 531 configured for focusing light rays 540 from a scene upon the half of the image sensor such that the light rays pass through the spectral filter material. The lens assembly comprises a second lens 532 configured for focusing light rays from substantially the same scene onto the other half of the image sensor such that the light rays do not pass through the spectral filter material. The imaging system further comprises a mask 545 configured to form an aperture around the first and second lenses. The overall image sensor resolution is 176×144 pixels. However, the array is split in two halves, each of which images substantially the same scene but one half does so through a spectral filter. Each half uses a subwindow of pixels, for example 144 pixels wide by 50 pixels high. Preferably the unfiltered half is used for lane detection. The field of view is preferably approximately 0.2 degrees per pixel. The lane detection algorithm preferably operates on the lower region of the image, for example, the bottom 15 rows and does not necessarily utilize all columns. It should be understood that the following and subsequent examples may be applied to various image sensors with various resolutions and various optical configurations. As costs of image sensors and processors decrease, it may be advantageous to use an image sensor with higher resolution and a wider field of view, for example 50 degrees or more. The wider field of view will allow a larger aim correction, better detection of vehicles around curves, and tolerance to a wider range of windshield angles. The present invention should not be construed as limited to any specific type or configuration of image sensor.

In each row, processing begins from the horizontal center pixel. Moving rightwards across the row, each pixel is examined to determine if it is significantly larger than the pixels two places to the right and left of the examined pixels. If so, it is determined that the pixel is imaging a portion of a bright line (i.e. the lane marker). The pixel's coordinate is stored in a list of right-lane coordinates and then the same process takes place moving left of the center pixel. If no bright pixel is found, then no coordinates are stored. The process repeats for each of the bottom 15 rows, storing the coordinates of the bright lane marker pixels in a right and left lane pixel list. If a sufficient number (for example, at least 4) of pixels were found for right or left lanes, linear regression is performed to determine the slope and intercept of a line fitting the lane points. A $R^2$ goodness of fit value is preferably used to determine if the points fall nearly on a line and if so, the resulting linear equation is used as an indication of the lane position.

If both left and right lanes are identified with a good $R^2$ value, the position of the lanes and road are known. The center point is computed as the intersection of these lines. If only one of the two lines is found, the second line can be approximated by knowing the relationship which exists between the slopes of the right and left lane. This relationship has been experimentally determined using examples of data collected when two lanes are present. The slopes and intercepts of one lane can be seen to generally be related to the other, since road widths are generally consistent. Thus, a reasonable approximation of the road position can be determined from a single lane. Once the road center and lane positions are determined, the position of an identified object relative to the road center can be used for an improved classification. Additionally, the position of an object relative to the lane line marker can also be used. For example objects right of the right lane are most likely to be signs.

Figure 8:
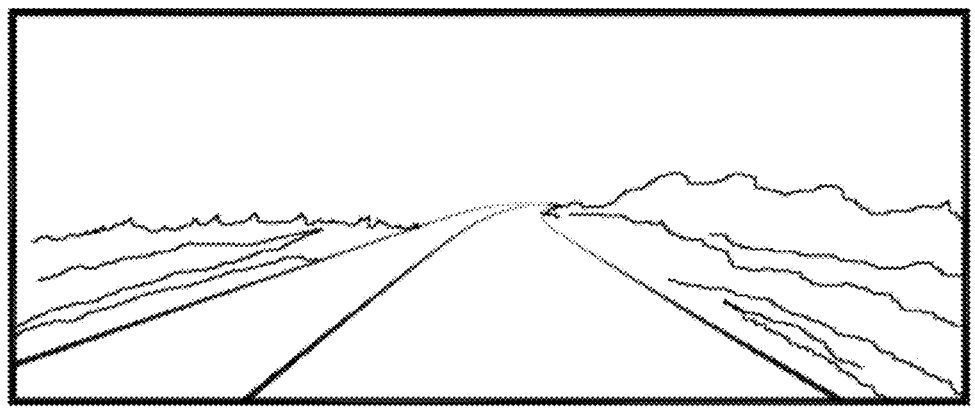
FIG. 8 depicts an actual image of a scene generally in front of a controlled vehicle.
Figure 9:
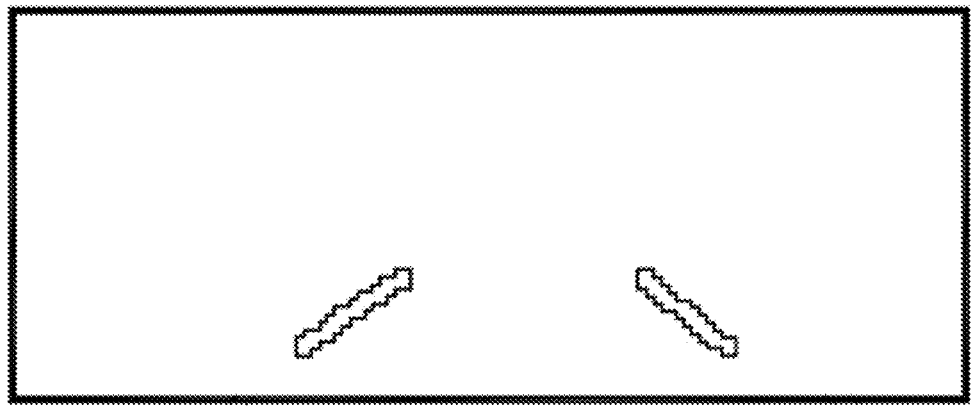
FIG. 9 depicts a result of extracting features from the image as depicted in FIG. 8.

In some cases road line markers will not be identified. This can be caused by a lack of paint on a rural road, snow, salt, or other sources of noise which obscure the lane or make it difficult for the described algorithm to identify the lane properly. For periods where the lane identification is intermittent, the center from recent prior identification of lane markers can be used. In other cases where lanes have not been identified for a longer period of time, the time averaged mean center position can be utilized. The present invention provides an improvement over prior systems by allowing the mean center to be calculated more quickly and dynamically than prior systems, due to fact that lanes are frequently visible. In cases where left and right lanes are clearly detected, the resultant center is averaged with the center from other recent time computations. The mean center should only be computed when the vehicle is traveling straight, which can be determined from a vehicle yaw sensor, a steering wheel sensor, a compass, or by insuring that the detected lane slopes are approximately equal in magnitude but opposite in sign, thus indicating straight travel. When lanes are not present, the time averaged value is used as the calibrated image center point. FIG. 8 shows an image from the camera of a road with lane markers. FIG. 9 shows pixels selected on the lane markers using the above described method.

Figure 10:
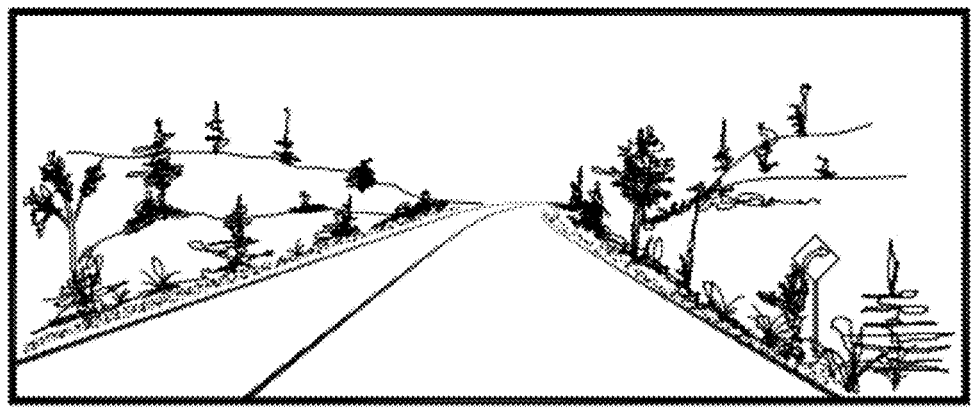
FIG. 10 depicts an actual image of a scene generally in front of a controlled vehicle.

In another embodiment of the present invention, the road illumination gradient is used to determine the road position. As can be seen in FIG. 8, the lane lines point to the center of the image. In FIG. 10, an image of a snowy road is depicted; there are no visible lane markers. However, one can visually see the road and the perspective of the road narrowing to a center point. This center point is identified in software by looking at illumination gradients. At many of the pixels in the lower half of the image, there is a direction in which the brightness of the pixel relative to its neighbors changes little, and in the perpendicular direction changes more rapidly. A direction dependent gradient computation filter is used to determine the magnitude and direction of this change. For example, the Sobel Operators:

$$\nabla f = \begin{bmatrix} Gx \\ Gy \end{bmatrix}$$
$$= \begin{bmatrix} -1 \cdot f_{i-1,j-1} - 2 \cdot f_{i-1,j} - 1 \cdot f_{i-1,j+1} + f_{i+1,j-1} + 2 \cdot f_{i+1,j} + f_{i+1,j+1} \\ -1 \cdot f_{i-1,j-1} - 2 \cdot f_{i,j-1} - 1 \cdot f_{i,j+1} + f_{i-1,j+1} + 2 \cdot f_{i,j+1} + f_{i+1,j+1} \end{bmatrix}$$

Where $f_{x,y}$ is the pixel grayscale value of the image pixel at location x,y and i,j is the current pixel location at which the gradient is being computed.

From these vectors the direction of the maximum gradient is computed. The direction perpendicular to this vector will point towards the center of the road. For any pixels exhibiting a strong gradient, the intersections of the perpendicular vectors to the gradient may be computed. This average intersection indicates the center of the road.

Formulas other than the Sobel operators may be used to determine gradient. It is especially useful to consider pixels beyond the adjacent pixels of the examined pixel.

In at least one embodiment, the motion of detected objects may be considered to determine the center of the image. As described in some of the prior referenced commonly assigned patents and patent applications, the detected objects may be tracked over time to determine their motion vector. In general, objects tend to emanate from the center of the image. The intersection of the motion vectors of several objects examined over time may be used to compute the average center point of the image. In cases where there are several objects this center point may be computed quickly.

Any of the above methods may be combined for best results. Other methods known in the art may also be combined with these methods. For example, when clear lanes are detected they may be used to determine the road location and center. When there are no clear lanes but strong gradients, these gradients may be used. When there is no clear road identified, the road location from recent images may be used. Finally, when the road had not been identified for an extended period of time, the time averaged mean center of the image from prior cycles may be used.

Classification of objects may be performed using a statistical analysis of collected and manually identified samples of objects recorded when driving. The various parameters of the object examined may include x-position, y-position, brightness, color, width, height, age, x-motion, and y-motion. In the present invention, x-position and y-position may be expressed as a difference from the currently identified center of the image. The parameters are examined using statistical analysis methods, such as those in the commercially available software program Minitab. For example, a binary logistic regression may be used to develop an equation which relates these parameters to a probability that the object is an exterior light, and another equation may be generated to determine the probability that the object is a tail lamp.

The example data may be divided into various subsets since there is not usually a linear relationship between any of the parameters and the probability of the object being a vehicle light. Within a subset the relationship may be more linear. Objects in the center of the image may be analyzed to develop an equation characterizing these objects. Separate equations may be developed for different areas of the image. Separate equations may be developed for various vehicle speeds or various turning conditions. Turning conditions may be based upon yaw rate, steering wheel sensors, compass, or derived from the road identification. Separate regression equations may be developed for situations when the road center is clearly identified from situations where the road cannot be clearly identified. For example, when the road is identified a strong dependence on position may be used for classification. When the road is not identified, the mean time-averaged image center location is utilized with a regression equation with less dependence on position, since the position information is less certain. Other methods of data analysis, such as those described in the referenced prior art may also be used in conjunction with the methods of the present invention. The inventions described herein for identification of the road may also be used for application other than exterior light control, for example lane departure warning systems.

Image sensors and image processing systems are increasingly being employed to perform a wide variety safety and convenience functions in motor vehicles. Examples of such functions include vision assistance, headlamp control, rain sensing, lane departure warning, collision avoidance, sign recognition, and adaptive cruise control. In some cases, where the fields of view needed for the application are similar or overlap, it is desirous to use a single camera to perform more than one of these or other functions. A single camera will require less physical space and may be less expensive than using multiple dedicated cameras.

While the use of a single camera to perform multiple functions is initially appealing, there are several technical and commercial obstacles complicating this goal. Many of the applications listed above require a field of view substantially in front of the vehicle, however the requirements of the camera are substantially different. A headlamp control system, which identifies the headlamps and tail lamps of oncoming and preceding vehicles, requires a field of view of 30° to 50°, resolution of approximately 5-10 pixels per degree, very high intra-scene dynamic range (i.e. the ability to sense a wide variety of light levels within a single image), very accurate color measurement for point light sources, and a frame rate of approximately 5 frames per second. A lane departure warning system requires a field of view of approximately 25° to 35°, resolution of greater than 5 degrees per pixel, a wide inter-scene dynamic range to adapt to varying daytime and nighttime light levels, and a frame rate of approximately 10 frames per second. A sign recognition system requires a narrower field of view but a very high resolution of greater than 20 degrees per pixel.

To perform multiple functions, the processor may have to process the image in very different ways. Reading a sign, for instance, differs substantially in method and complexity from detecting headlamps or tail lamps. Some applications can function by analyzing a continuous stream of video images. Headlamp control, in contrast, requires the imager to abruptly change between exposure times and image windows. As described in the patents and patent applications incorporated by reference elsewhere herein, street lamps can be distinguished from headlamps by detecting the AC ripple in their intensity. This detection requires the imager to acquire small windows at frame rates of 480 frames per second. After the streetlamp analysis, full field images are then acquired for the next cycle.

In addition to the technical hurdles there are substantial commercial hurdles complicating implementation of multiple functions from one camera. An automotive manufacturer may prefer to use different suppliers to provide different functionality based upon the expertise of the individual suppliers. The image processing software and methods developed by each supplier likely utilize a wide variety of computation hardware, each optimized for the particular function. Although it may be technically conceivable to implement several function on one processing platform it is likely very difficult or impractical to do so. Thus, to allow several different functions to be performed with a single camera it is necessary to provide the image data to different processing platforms provided for each application while preserving the image sensing control flexibility needed for some of the applications to operate properly.

The present invention provides a camera which can be controlled by one or more of the image processing systems to allow for a variety of image acquisition parameters while providing a continuous standard video stream to other applications.

Figure 6:
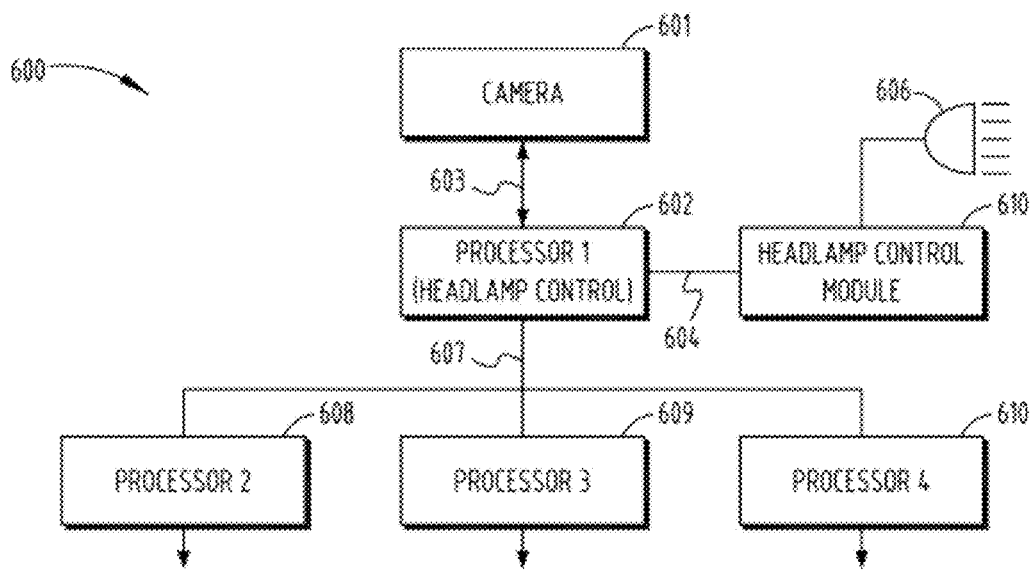
FIG. 6 depicts a block diagram of a vehicle equipment control system.

An example of an image processing system 600 according to an embodiment of the present invention is shown in FIG. 6. In this example, an image sensor 601 is controlled by a processor 602. Communication of image sensor control parameters as well as image data occurs over communication bus 603, which may be a bi-directional serial bus, parallel bus, a combination of both, or other suitable means. Processor 602 serves to perform the headlamp control function by analyzing the images from camera 601, determining the headlamp state based upon these images, and communicating the determined headlamp state to a headlamp control module 605 through bus 604, which may be a CAN bus or any other suitable communication link.

As described in hereinabove, the headlamp control function requires the image sensor to be activated in several different modes with different exposure times and different readout windows. Because of this complexity, processor 602 is selected to both perform the headlamp control function and control the parameters of the image sensor 601. Other functions, such as those listed above, can receive the image data from image sensor 601 without needing the direct image sensor control required by the headlamp control function. Thus, the image data from image sensor 601 can be communicated to one or more other processors (shown as 608, 609 and 610) from processor 602 through an image data link 607. The image data link may be a MOST bus, a high-speed CAN bus, or any other suitable electronic data communication scheme. The communication can be uni-directional or bi-directional. The latter case allows additional processors to communicate with processor 602 to modify the image acquisition parameters if required. In a preferred embodiment, image data link 607 is implemented as described in commonly assigned U.S. Patent Application Publication No. 20050135465, the entire disclosure of which is incorporated herein by reference.

While performing the headlamp control function processor 602 will request images of the full field of view at one or more exposure times. These images will then be processed for the headlamp control function. Simultaneously with processing, these images will be sent over image data link 607 to the other processors. Processor 602 may perform some pre-processing such as filtering, dynamic range compression, or color computation on the images before transmission. In addition to the image data the acquisition parameters used to take the image may be sent in the event this information is needed by one of the other applications. Once the image data is received, the other processors may analyze the data independent of processor 602 and perform the required function. Additional images required solely for the headlamp control function may be acquired between transmission of images to the other processors.

During conditions when the headlamp control function is not active, such as in daytime or when disabled, processor 602 may still serve to acquire the images, pre-process the images, and transmit them to the other processors. Processor 602 may also perform auto-exposure control to determine the appropriate imaging parameters for the current lighting conditions. Alternatively, processor 602 may receive instructions from one of the other processors to adjust exposure time or other parameters. Occasionally, the output from one function may be used to supplement performance of another function. For example, the location of road lanes detected by a lane departure warning system may be used by the headlamp control function to allow determination of the location of light sources relative to the road location. In this case, data other than image data may also be computed between functions over image data link 607.

Figure 7:
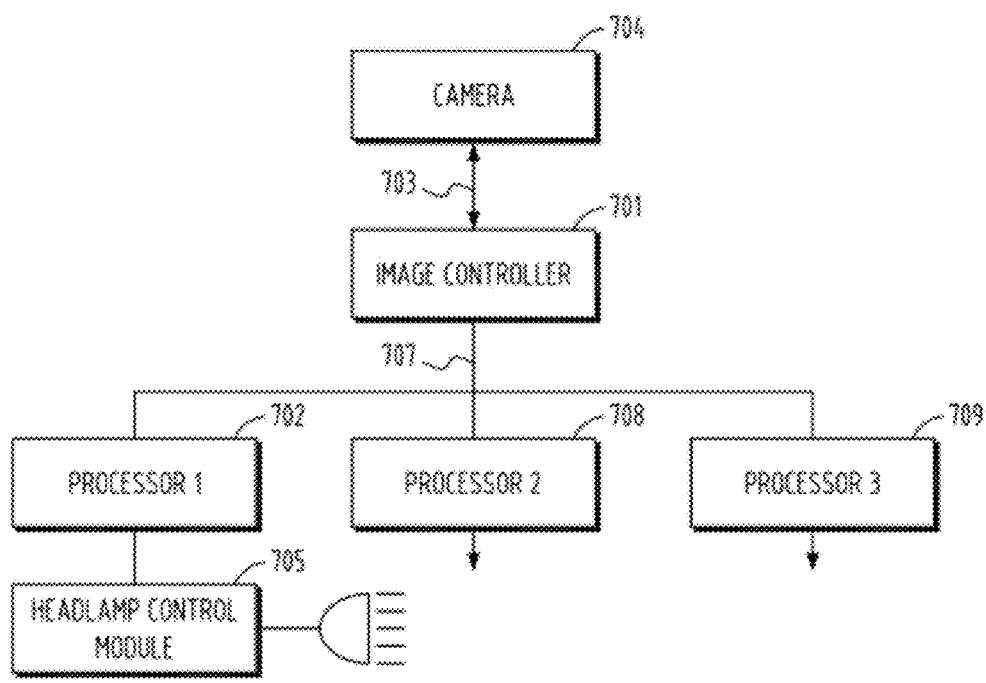
FIG. 7 depicts a block diagram of a vehicle equipment control system.

In the first embodiment, processor 602 serves as a "master" processor and the other processors serve to receive information from the master. In an alternative embodiment shown in FIG. 7 a dedicated image controller 704 is provided which serves to control the image sensor 701 and may serve to perform pre-processing such as auto-exposure, dynamic range compression, filtering, or color computation. The image data is then transmitted over data link 707 to each of the processors. Processor 702 again serves to perform the headlamp control function but requests images from the image controller 704 rather than controlling the camera directly. The one or more additional processors 708 and 709 may also request specific image data from image controller 704 or may simply receive image data on a regular interval. Image controller 704 manages the image requests from multiple processors while providing a regular output of image data to all processors. It is envisioned that image controller 704 may be provided integral with image sensor 701 and possibly even integrated monolithically on the same silicon chip as the image sensor.

In both embodiments described herein the image sensor 701 may be located on the mount of a vehicle rear-view mirror. Locating the camera on the mirror mount has several advantages: The mount is rigid and stationary, the mirror mount is typically located in the vehicle's windshield wiper path, and the factory installation is simplified as the mirror is already being attached. The camera may be placed separate from the mirror, but an additional factory installation step is then required.

Regardless of the location of image sensor 701, processor 702 (or alternatively image controller 704) may be co-located with image sensor 701, on the same or separate circuit boards. These processors may also be located in a rear view mirror body and may serve to perform other functions such as a compass sensor or control of an auto-dimming rear-view mirror. These processors may also be located in a headliner, over-head console, or other suitable location in the vehicle.

Figure 11:
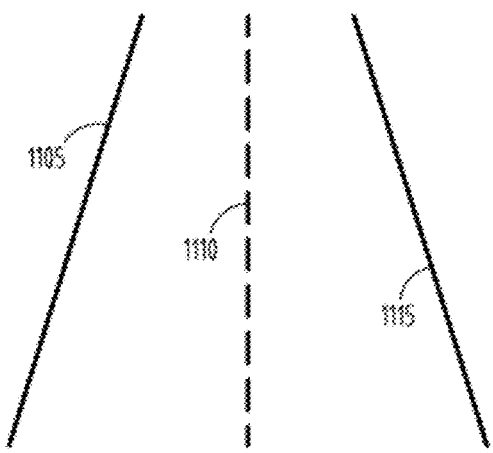
FIG. 11 depicts a drawing of a roadway with lane markers.

Turning now to FIG. 11, an image of a roadway is depicted including left lane line 1105, center lane line 1110 and right lane line 1115. In a preferred embodiment, the sensitivity of the associated image sensor is set such that the area within the image void of lane lines results in related pixel values of approximately twenty percent of the full scale value obtainable from the given pixels; it should be understood that the sensitivity may be set to result in thirty percent, forty percent, fifty percent or any other desired value. The most preferred sensitivity setting will result in the pixels actually detecting lane markings having a value less than full scale (i.e. not washed out).

Figure 12:
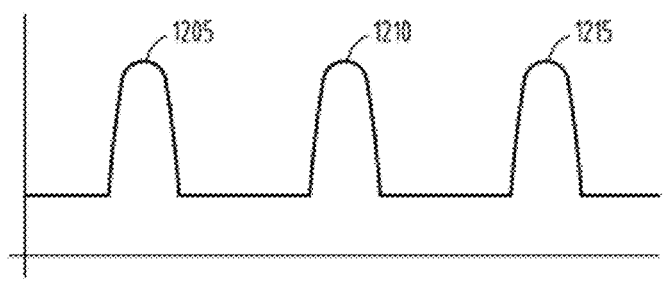
FIG. 12 depicts a graph of a row of pixel data that would result from an image of the drawing of FIG. 11.
Figure 13:
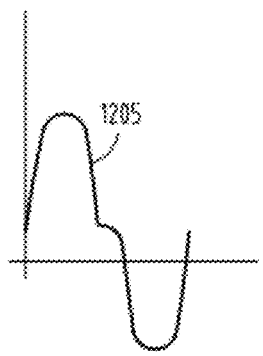
FIG. 13 depicts a graph of the first derivative of one of the lane markers of FIG. 12.
Figure 14:
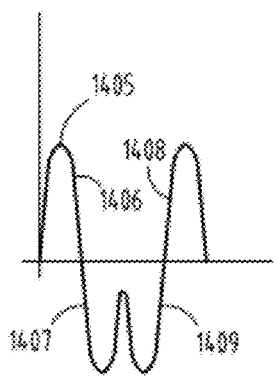
FIG. 14 depicts a graph of the second derivative of FIG. 13.
Figure 15:
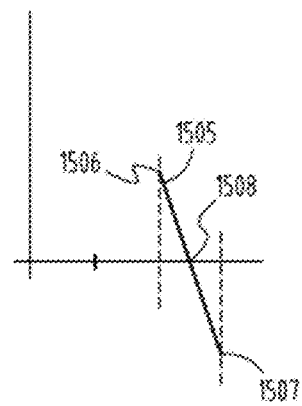
FIG. 15 depicts an exploded view of a section of the graph of FIG. 14.

FIG. 12 depicts a graph of the pixel values of a representative row of the image of FIG. 11. The left lane line 1205, the center lane line 1210 and the right lane line 1215 induce higher values in the associated pixels. It is desirable to identify the pixels in each row of the image that correspond to the edges of the given lane line. In a preferred embodiment a first derivative is taken of the values as depicted in FIG. 12. The result of the left lane line is depicted in FIG. 13 as first derivative 1305. Taking the first derivative of the values of FIG. 12 results in "thresholding out" noise associated with the raw pixel values. In even a more preferred embodiment a second derivative 1405 is calculated resulting in the graph depicted in FIG. 14. The second derivative reveals a positive to negative transition between points 1406 and 1407 indicative of a first edge of a lane line and a negative to positive transition between points 1409 and 1408 indicative of a second edge of a lane line. Taking the second derivative results in identification of the point of inflection associated with the given row of pixel values being analyzed. FIG. 15 depicts an exploded view of the positive to negative transition 1505 with point 1506 corresponding to a first pixel and point 1507 corresponding to a second pixel. Interpolation of these values results in determining a precise location 1508 for an edge of the associated lane line. It should be understood that similar analysis may be performed to precisely locate each edge of each lane line within the associated image.

Figure 16:
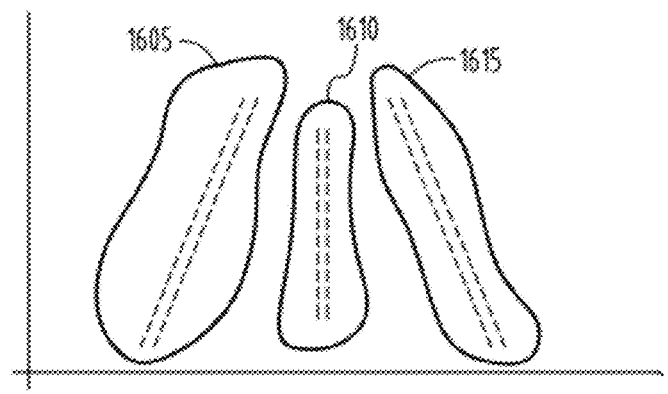
FIG. 16 depicts the features identified in the drawing as depicted in FIG. 13.
Figure 17:
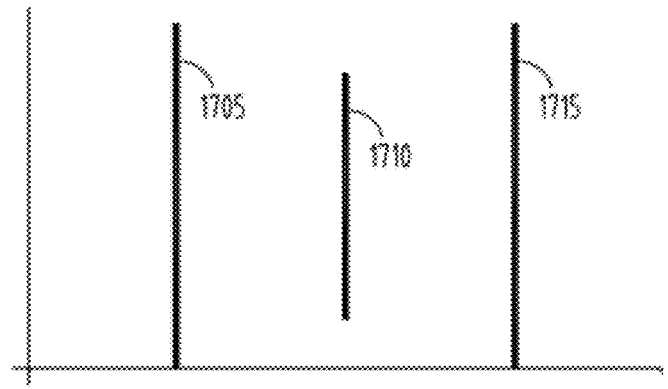
FIG. 17 depicts a road model developed from a drawing as depicted in FIG. 13.
Figure 18:
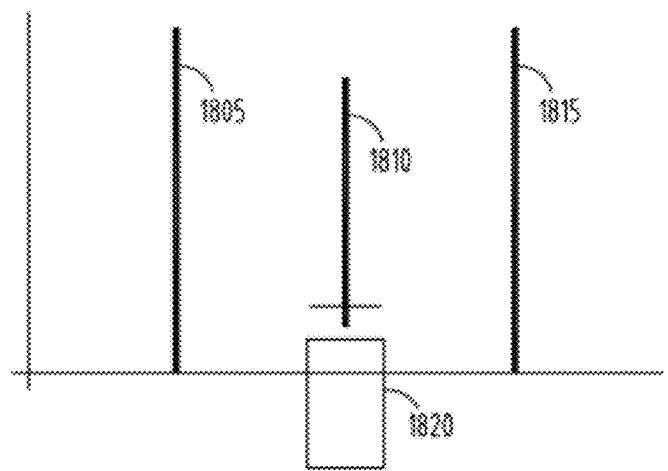
FIG. 18 depicts a road model developed from a drawing as depicted in FIG. 13 with a controlled vehicle superimposed.

Turning now to FIG. 16, a translated image is depicted to include a first feature 1605, a second feature 1610 and a third feature 1615. In an ideal situation these three features will correspond to the left, center and right lane lines of the original image with associated noise removed or reduced as compared to the original image pixel values. In an embodiment of the invention, the values of FIG. 16 are transposed to derive a "plan view" of the corresponding left line 1705, center line 1710 and right line 1715. As depicted in FIG. 18 a rectangle 1820 indicative of the controlled vehicle is combined with a horizontal line 1825 to be used to determine whether or not the controlled vehicle is deviating from the appropriate lane. If the vehicle is suppose to be traveling in the right lane a determination will be made to check for intersection of either line 1810 or 1815 with the horizontal line 1825 and or rectangle 1820. If the vehicle is supposed to be traveling in the left lane a determination will be made to check for intersection of either line 1805 or 1810 with the horizontal line 1825 and or rectangle 1820. If either of the associated lines is found to be intersecting with the horizontal line 1825 and or rectangle 1820 an audible and or visual alarm may be initiated within the controlled vehicle cabin to alert the driver of a lane departure. It should be understood that an appropriate audible and or visual alarm device may be incorporated into a rearview assembly along with at least one corresponding image sensor and/or at least one processor. It should also be understood that an output of a given processor and/or image sensor may be provided to an original equipment manufacture to initiate an audible and/or visual alarm anywhere within the vehicle in sight or hearing range of the driver. It should be understood that automatic steering may also be configured to be activated as a result of the lane detection algorithm discussed above. The steering of the vehicle may be "encouraged" to guide the controlled vehicle in a certain direction which may be overcome by the driver with slightly more force than required to steer the vehicle without a lane departure detected.

Figure 19:
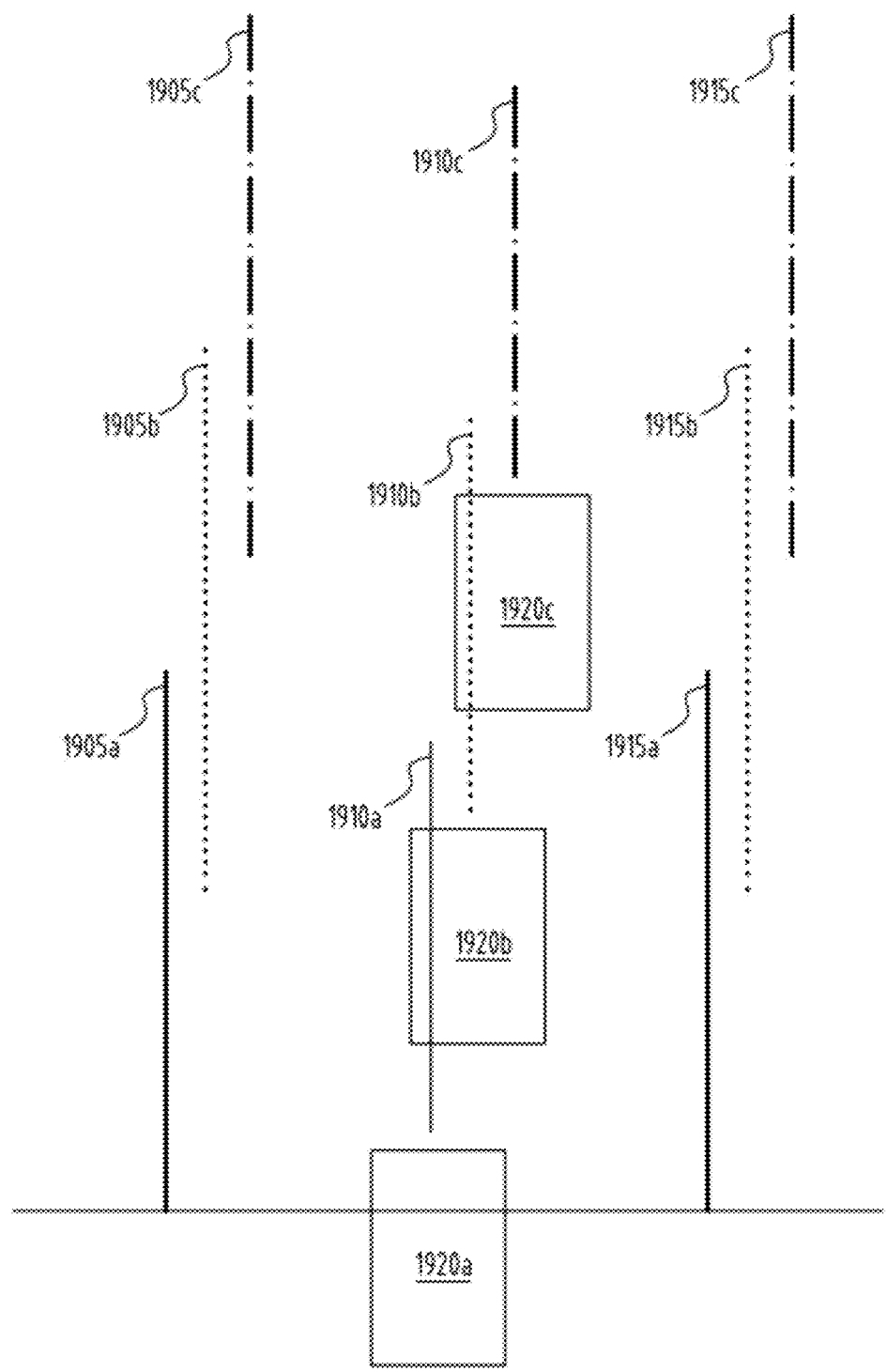
FIG. 19 depicts a sequence of road models developed from a sequence of drawings each of which is shown in FIG. 13 with a controlled vehicle superimposed.

Turning to FIG. 19, a lane departure detection algorithm is described with reference to three consecutively acquired images. A first image depicted with solid graphics includes a left lane line 1905*a*, a center lane line 1910*a*, a right lane line 1915*a* and a controlled vehicle 1920*a*. A second image depicted with dotted graphics includes a left lane line 1905*b*, a center lane line 1910*b*, a right lane line 1915*b* and a controlled vehicle 1920*b*. A third image depicted with dashed graphics includes a left lane line 1905*c*, a center lane line 1910*c*, a right lane line 1915*c* and a controlled vehicle 1920*c*. In a preferred embodiment, a controlled vehicle yaw sensor input and or a controlled vehicle speed input are combined with a sequence of consecutively acquired images to determine when the controlled vehicle has crossed or is about to cross a given lane line. As described with regard to the above embodiment different lane lines will be analyzed depending whether the controlled vehicle is suppose to traveling in the right lane or left lane. In a preferred embodiment, the speed of the controlled vehicle, the yaw of the controlled vehicle and the consecutively acquired images are combined to anticipate a lane departure. In a preferred embodiment an audible and/or visual alarm is initiated upon an impending lane departure. In at least one embodiment the controlled vehicle steering is affected as described above.

Figure 20:
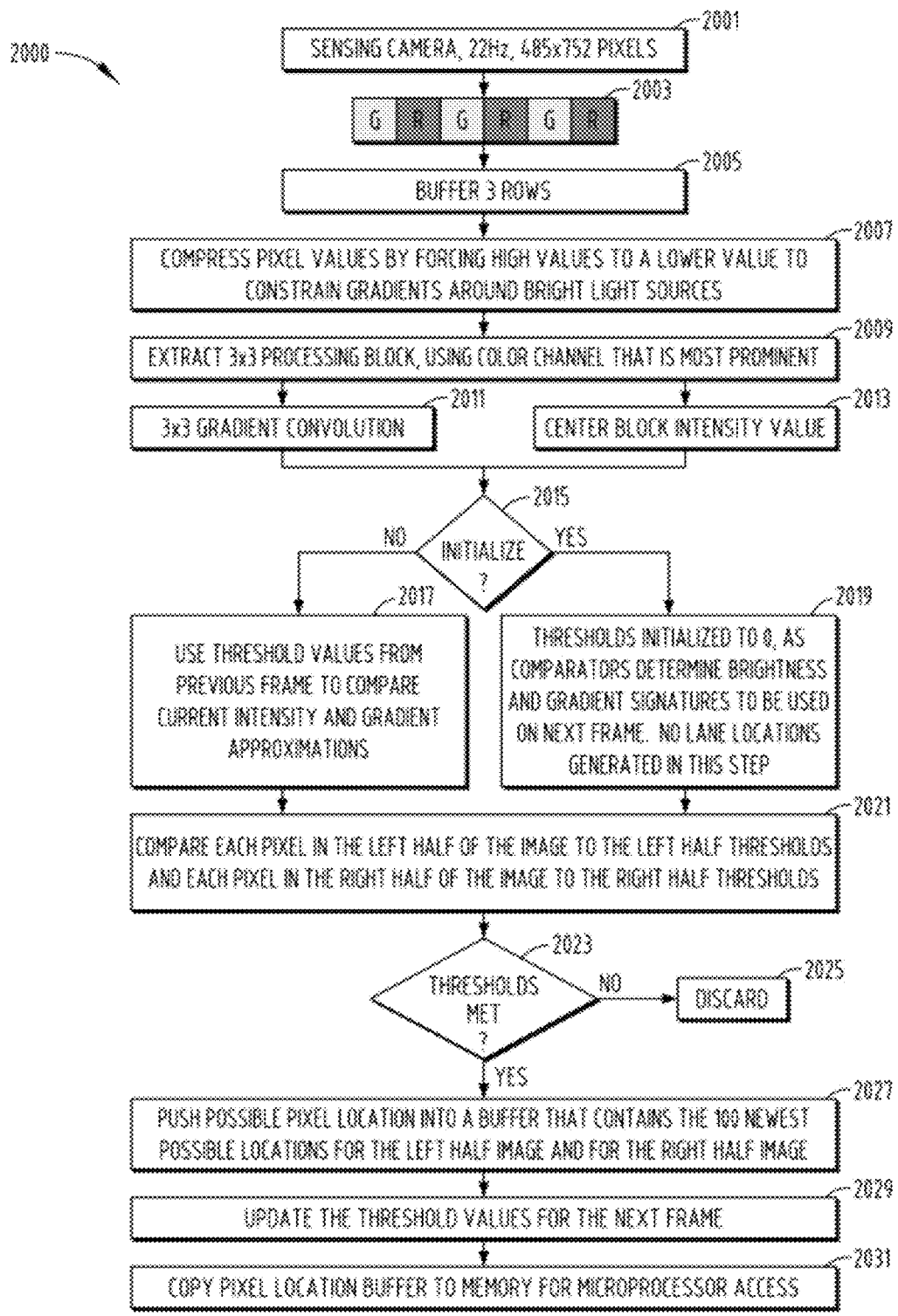
FIG. 20 is a flow chart diagram illustrating an adaptive edge detection process using pixels from an imaging camera for independently determining which pixel locations correspond to lane line locations in the left-half and right-half image for each streamed row of data.

FIG. 20 is a flow chart diagram illustrating an adaptive edge detection process according to another embodiment of the invention. The adaptive edge detection process uses pixels from an imaging camera for independently determining which pixel locations correspond to lane line locations in the left-half and right-half image for each streamed row of data in a field programmable gate array (FPGA). Those skilled in the art will recognize that an FPGA is an integrated circuit designed to be configured by the customer or designer after manufacturing—hence it is "field-programmable". As will be described herein, the adaptive edge detection process requires storage of only 200 (or some other total value) lane line locations using only a substantially small number of pixel comparators and accumulators. Roadway lane line edges in the imaging scenes captured by a forward-looking imager or camera are generally located in an image where bright pixels occur consecutively and in conjunction with large image gradients. This often indicates a substantial change in image pixel intensity across a small spatial support. Well-known and reliable edge-detection algorithms can be combined with the knowledge of the location and relative intensity of bright pixels in an image scene to easily locate the lane lines. However, determination of whether a pixel is indeed simultaneously a member of both the bright pixel and large gradient class generally would require a comparison of all pixels within a given row of the image.

Storage of an entire row of image pixels is not preferred when striving for lowest-cost implementation. Thus, alternative methods for determining which pixels in a given row might belong to a road lane line are required. A method as described with regard to FIG. 20, operates to independently determine which pixel locations correspond to lane line locations in the left-half and right-half image for each row. The method as described herein requires only the storage of 200 lane line locations and a small number of pixel comparators and accumulators, assuming the required number of pixels rows have been buffered to perform the spatial convolution in the gradient approximation step. Such an embodiment would alleviate the inter-row processing requirements for determining the maximum intensity and large gradients, reducing the complexity of hardware design. It also assumes, though, that at least three rows of pixel data have been stored on the hardware device for said analysis, or other pixel-related processing required for other vehicle-related applications (e.g. automatic headlight control, forward collision warning, object detection, etc.)

For example, in terms of quantifying the storage requirement benefits, sorting an entire image row might typically require the storage of 18 kilobits of pixel data (given a 480 row×752 column imager with 24-bit pixel values). Since the lane lines may not correspond to the brightest pixels in the image, the relative pixel heights and gradient values would have to be compared to detect lane line locations. In contrast, the methods according to the embodiment as described herein, require at most 480 bits of data to be stored, which is more than a 97% reduction in the size of the implementation. Thus, implementation of the adaptive edge detection as described herein works to free computing resources for other pixel processing tasks that would otherwise be used in determining the maximum pixel intensity and gradient using all pixels in a given image row.

The adaptive edge detection process 2000 begins using a sensing camera or imager capturing images 2001. By way of explanation and not limitation, a typically imager might provide a pixel stream 2003 with a 485×752 pixel resolution at frame rate of 22 Hz. According to an embodiment of the invention, the imager streams color pixels into a FPGA. The FPGA stores incoming pixel data that are streamed from the imager in a manner such that two (2) full rows and at least six (6) additional pixels of imaging data are generally stored in a first-in first-out (FIFO) type format. For example, the storage element or buffer on the FPGA may hold two times seven hundred fifty two and the additional six pixel values (2×752+6). In use, if each pixel value is left uncompressed, the pixel would be 24 bits in size. Two rows of pixels are fully stored so that when a third row is streamed the other pixel data stored in the prior rows is used to calculate a spatial gradient using 3×3 kernel spatial convolution techniques. The 1510 pixels in this buffer are stored so the eight-neighborhood of pixels can be access around a given center pixel. As that third row is filled, pixels previously processed are shifted down so that oldest pixel data is then removed to make room for new pixel data.

Once the three rows are stored in buffer 2005, these pixel values are compressed by forcing a high value to a lower value to control gradients around bright light sources. Typically, compression is used to limit or bound the threshold values that are used in a nighttime driving environment. Normally very bright pixels are present at the full dynamic range of the imager (e.g. light emanating from a source). However, at night, lane lines are significantly dimmer than light sources due to their brightness being generated by reflection of light back to the imager. High dynamic range of the intensities in an image will result in undetected lane lines in the presence of significantly brighter objects (e.g. the headlights of an oncoming vehicle). Thus, in this nighttime environment, the dynamic range for each pixel must be reduced by representing each pixel with 16 bits or 8 bits instead of 24 bits. This reduction in resolution works to greatly reduce the buffer size and processing complexity because the difference or gradient between road image size and reflected light source is much smaller than during daytime driving conditions. Similar dynamic range compression does not adversely impact the relationship between lane line and non-lane line pixels during daytime operation.

After the pixel values are compressed 2007, this stored information is extracted 2009 into a 3×3 spatial convolution processing block using a color channel that is the most pertinent. Thereafter, a 3×3 gradient convolution (via a Sobel kernel) is determined and the center block intensity value and gradient response are stored for comparison. Since a color filter is typically used with the imager, the FPGA can be configured to process only the color information in different ways. Typically, color imaging processes use a color or "Bayer" interpolation technique, where all of the green pixels are used to fill gaps of the red and blue pixel such that each green pixel operates as an approximation for the pixel locations that are red and blue on the sensor. Similar interpolation is performed on the red and blue pixels to achieve a full resolution color image consisting of three color bands (red, green, and blue). However, the method as described in an embodiment of this invention uses the Bayer pixel space to process only green pixels. The green color is chosen because it is typically the most prevalent on the imager and gives the best resolution. Although this process uses only green pixels, those skilled in the art will recognize that a similar process could be performed for the red pixels and the blue pixel values. Color information is not required for implementation of the present invention, thus a significant amount of pixel processing resources are saved.

Figure 21A:
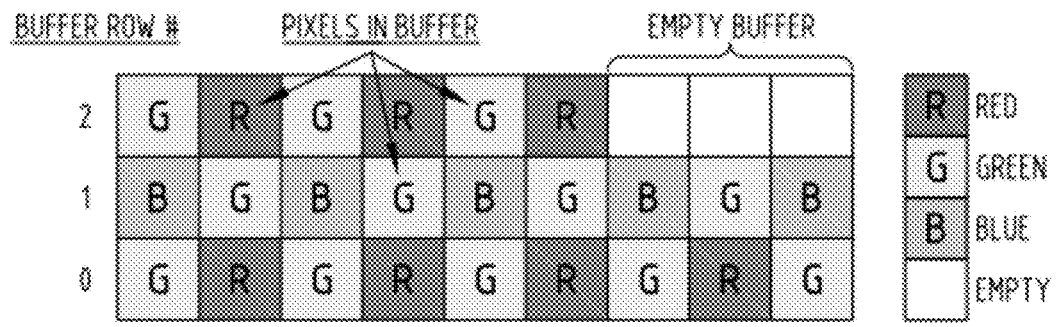
FIGS. 21A, 21B and 21C are charts illustrating examples of buffer storage when the buffer receives data from an imager according to various embodiments of the invention.
Figure 21B:
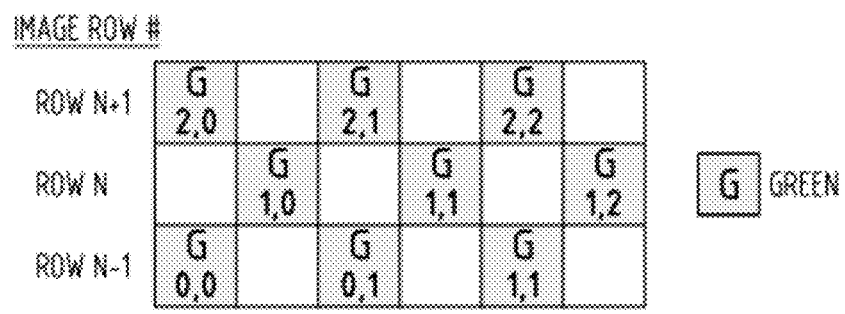
Figure 21C:
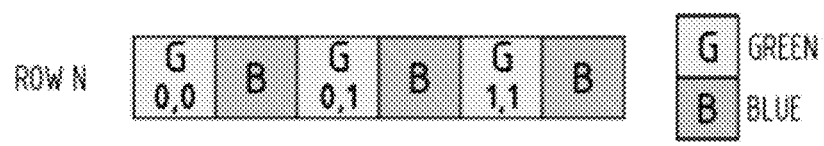

FIGS. 21A, 21B and 21C are charts illustrating examples of buffer storage when the buffer receives data from an imager according to embodiments of the invention. Due to the color filter used in connection with the camera, the pixel value read in from the imager are in alternating colors and rows (e.g. green/red vs. green/blue). As seen in FIG. 21A, once two rows are stored in the buffer, and the third green pixel has arrived on the third row, then processing can take place. As pixels continuously fill the finite buffer, new pixel values replace the old pixel values. For example, as seen in FIG. 21A, when Row 3 is being read, pixels in Row 0 will be overwritten, as Row 1 and Row 2 will be shifted "down" to make room for Row 3. As shown in FIG. 21B, for a given set of nine green pixels, the intensity value of the center pixel is stored at index (1,1). The nine pixels extracted are convolved with a Sobel edge detector to approximate the gradient at the image location coinciding with the center of the 3×3 neighbor shown at index (1,1). If P is the 3×3 pixel array, then the approximation of the gradient at P(1,1) can be represented by Equation 1 below:

$$G = -P(2,0) - 2*P(1,0) - P(0,0) + P(2,2) + 2*P(1,2) + P(1,1) \quad \text{(Eq. 1)}$$

where those skilled in the art will recognize the coefficients multiplied with the pixel values noted by the indices, P(n,m) are from a 3×3 Sobel edge detection kernel.

This approximation to the gradient of the image, G, is stored at a location that coincides with the center of the 3×3 pixel processing block. The scaled intensity value of the center pixel at index (1,1) of the 3×3 pixel processing block is also stored (P). Thereafter, a determination is made if an initialization is required on the first frame or after the system fails to detect a lane for a determined number of sequential frames 2105. If no initialization is required 2017, then the threshold values from a previous frame are used to compare the current pixel intensity and gradient approximations. However, if the first frame is to be initialized 2019, then the thresholds are initialized to zero as comparators determine brightness and gradient signatures to be used on the next frame. As will be evident to those skilled in the art, no lane locations are generated by this initialization and comparison.

In an alternative embodiment of the invention, which is only possible using the adaptive techniques already described herein, lane line locations can be determined using no pixel storage buffer. In this method, instead of operating on a 3×3 region for pixels, the method operates using three consecutive green pixels along a single image row. A one dimensional (1-D) convolution of the three pixels values are performed with the coefficients from the second row of the 3×3 Sobel kernel provides a localized approximation to the gradient around a given pixel in the horizontal dimension only. As shown in FIG. 21C, three green pixels are used for making an approximation of the gradient by using Equation 2 below:

$$G = -2*P(0,0) + 2*P(1,1)) \quad \text{(Eq. 2)}$$

To understand the storage requirement benefits, consider storing enough pixels to perform the gradient approximation using a 3×3 Sobel kernel. This would require the storage of 27 kilobits of pixel data (for a 480 row×752 column image of 24-bit pixel data). In contrast, the methods according to the embodiment as described herein along a single image row, require at most 48 bits of data to be stored. In terms of the amount of pixel data being read into the device, the amount of memory required using an adaptive approach is approximately 0.2% of the 3×3 kernel approach, indicating that the methods as described herein are virtually "memoryless". Thus, implementation of the adaptive edge detection as described herein works to free computing resources for other pixel processing tasks that would otherwise be used in determining the maximum pixel intensity and gradient using all pixels in a given image row.

Figure 22:
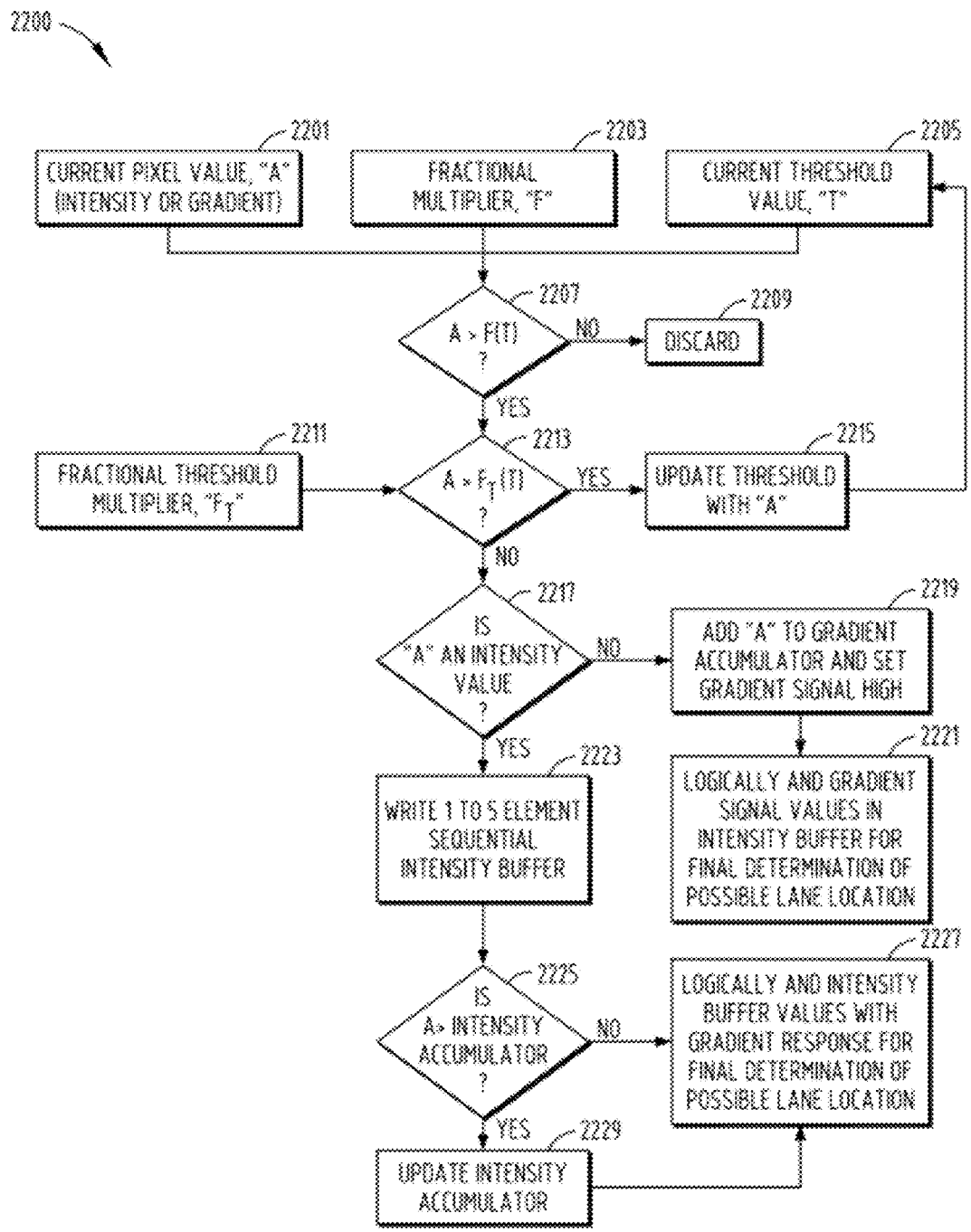
FIG. 22 is a flow chart diagram illustrating the process used in comparing each pixel in a left-half of an image to a left half threshold and each pixel in a right half of an image to a right-half threshold.

FIG. 22 is a flow chart diagram illustrating the process used in comparing each pixel in the left half of an image to a left half threshold and each pixel in the right half of an image to a right half threshold. The process is shown in steps 2021, 2023 and 2025 where the comparison is made 2021, a determination is made if a threshold is met 2023 and if the pixel does not meet intensity and gradient threshold values can be discarded 2025. More specifically, the comparison process 2200 begins with a current pixel value "A" representing either intensity or gradient value 2201, a fractional multiplier "F" 2203 and a current threshold value "T" 2205. The fractional multiplier is a multiplier that depends on the comparison type (intensity or gradient) and night or day operation. A separate fractional multiplier $F_t$ is used to update the current threshold value. A total of 16 multipliers have been identified, i.e. left side intensity (day), left side intensity (night), left side update intensity threshold (day), left side update intensity threshold (night), left side gradient (day), left side gradient (night), left side update gradient threshold (day) and left side update gradient threshold (night). Each of these 8 values are also uniquely defined for the right half side of the image.

These values A, F and T are then used to determine if the current pixel value is greater than the product of the fractional multiplier and the current threshold value 2207. If A is not greater than the product of F*T, then the current pixel value A is discarded 2209. However, if it is greater, then a second determination is made if the A is greater than the product of $F_T$ and T 2213. If the pixel value is greater than the threshold value, it is updated A and these values are supplied to the current threshold value 2215. However, if the pixel value A is not greater than the product of the fractional multiplier and the current threshold value, then a determination is made if the current pixel value is an intensity value 2217.

If the current pixel value A is not an intensity value, then A is added to a gradient accumulator and the gradient signal is set to high 2219. The gradient signal values are used to logical AND an intently buffer for a final determination of possible lane location 2221. However, if the current pixel value A is an intensity value, then a 1 is written to a five (5) element sequential intensity buffer 2223. A determination is made if the current pixel value A is greater than the value in the intensity accumulator 2225. If not, then the intensity buffer values are used in a logical AND with a gradient response for a final determination of a possible lane location 2227. If the current pixel value A is greater than the intensity accumulator then the intensity accumulator is updated with that value 2229 and the intensity buffer values are used in a logical AND with a gradient response for a final determination of a possible lane location 2227. As seen in FIG. 20, once the thresholds are met 2033, the pixel location is stored in buffer that contains approximately 100 (or another number, based on design) of the newest possible locations for the left half image and 100 (or another number, based on design) of the newest possible locations for the right half image 2022. The threshold values are then updated for the subsequent frame 2029.

Figure 23:
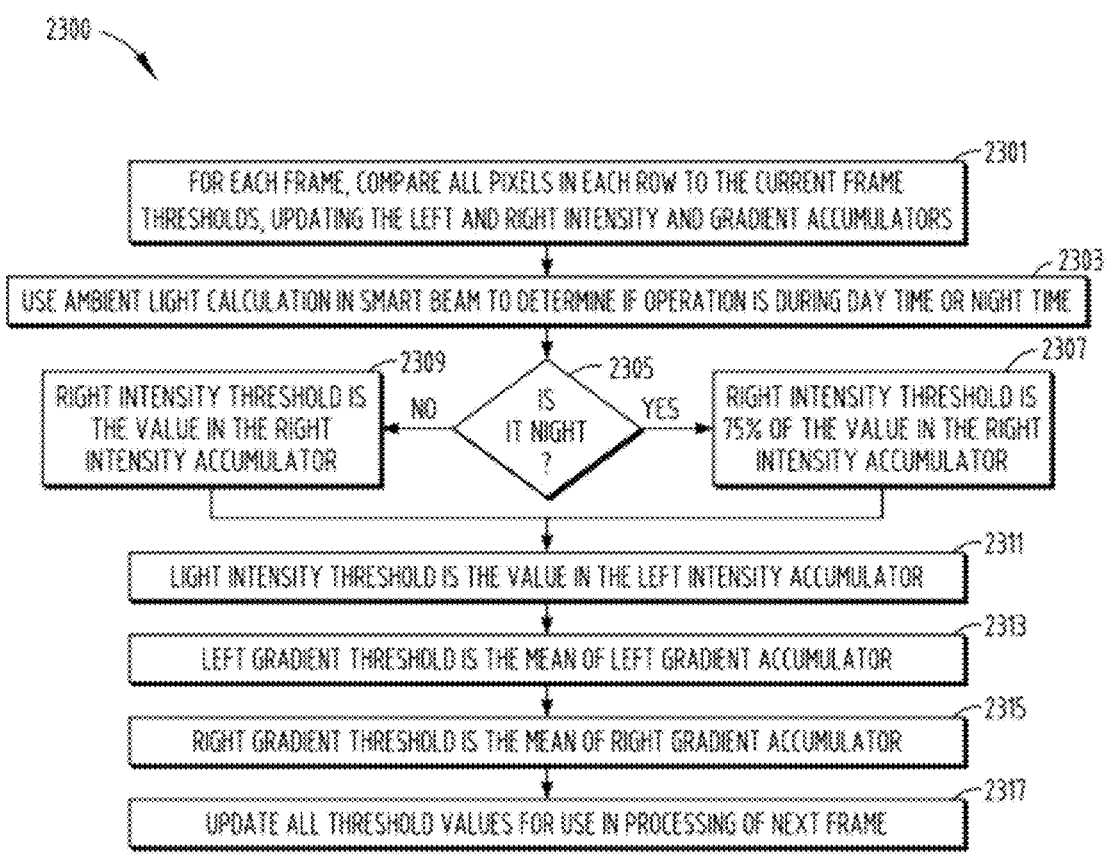
FIG. 23 is a flow chart diagram illustrating how the threshold values are updated in memory.

FIG. 23 is a flow chart diagram illustrating how the threshold values are updated in the buffer. More specifically, the update process 2300 includes comparing all the pixels in each row to the current frame thresholds for each row 2301 using the process shown in FIG. 22. Therefore, the left and right intensity and gradient accumulators are updated. The ambient light calculation is used in a vehicular vision system, e.g. Smartbeam® by Gentex Corporation, or through another mechanism (such as an ambient light sensor) for determining if operation is to be during day or night time lighting conditions 2303. If it is determined that it is a nighttime condition 2305, then the right intensity threshold is 75 percent of the value of the right intensity accumulator. If it not night, i.e. daytime, then the right intensity threshold is the value of the right intensity accumulator 2309. This is assuming the intensity accumulator is updated on a pixel by pixel basis, and only stores the maximum value encounter for a given frame. Once the left intensity threshold is the value in the left intensity accumulator 2311 the left gradient threshold is the mean of the left gradient accumulator 2313 and the right gradient threshold is the mean of the right gradient accumulator 2315. The threshed values are all updated for use in processing of the next frame 2317. Finally as seen in FIG. 20, the pixel location buffer is copied to memory for use by a microprocessor 2031 in the vehicular vision system.

Figure 24:
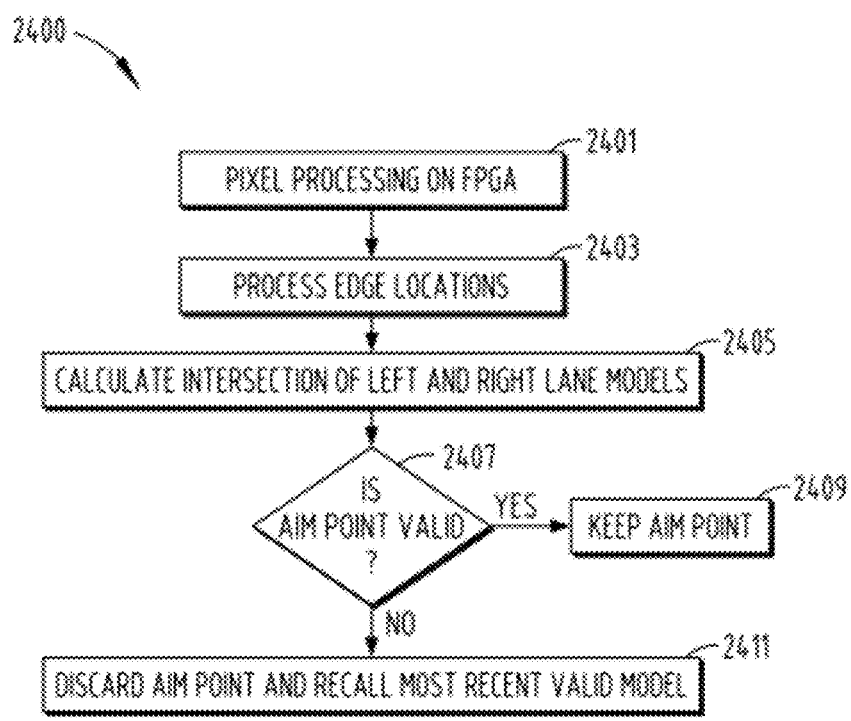
FIG. 24 is a flow chart diagram illustrating the process of how the threshold values are used in a vehicular vision system.

FIG. 24 is a flow chart diagram illustrating the process of how the threshold values are used to determine a valid aim condition in a vehicular vision system. The aim validity process 2400 begins where the pixels are processed typically on an FPGA in the vehicle system according to the processes described with regard to FIGS. 20-23 which are represented by step 2401. Thereafter, once a valid history can be used, the edge locations of the lane edges are processed 2403. Based on this processing information, the intersection of the left and right lane can be calculated 2405. If a valid lane model had been determined for a frame prior than the current frame being processed, the edge locations provided by the FPGA are compared to points extrapolated from the prior model. Outlying points are then not included in the regression analysis for model determination. Additional validity checks are then performed. These checks include such information as whether the aim point lies in an acceptable region, whether the left and right slopes are similar to a current frame; and whether the current models are consistent with most recent frame models. If it is determined that it is a valid aim point 2407, then the aim point is kept and stored in memory 2409, however if it not valid, then the aim point is discarded and the most recent valid model is recalled 2411.

Thus, according to an embodiment of the invention, an adaptive edge detection process is used in an FPGA for determining lane locations for aiming of a vehicular vision system. Further, the embodiment of the invention defines a process where eight neighboring pixels of the same color (e.g. green for an RGGB color filter) are processed by a 3×3 Sobel edge detection mask to approximate the gradient at the current pixel location. If the pixel meets the determined criteria for both the intensity and gradient threshold value, it is considered a candidate lane line pixel, and its location is stored. As the rows of the current video frame are traversed, the candidate lane line locations are stored in left-half and right-half location buffers. These are limited to 100 (or some other fixed value) points for each side of the video frame. If the location buffer fills before the entire video frame has been processed, subsequently found candidate locations are added to the buffer and the oldest locations are removed. In this way, later-arriving locations, which are closest to the vehicle and therefore considered to be higher quality, are considered to the exclusion of lesser quality (further from the vehicle) candidate lane line locations. Once all candidate lane line locations are found for the current frame, additional logic is used to determine which locations most closely correlate with typical lane geometries found in road scenes. After the best-matching locations are found, linear regression is performed to fit a left and right linear lane line model. These models are used to determine the intersection point of the two lines, which corresponds to the vanishing point in the video frame. In cases where linear lane models are known from the preceding frame, the current frame lane line locations are required to be within a specified tolerance of the previous frame lane line models. This reduces outlier points that may skew the lane line model and introduce error into the calculation of the current frame vanishing point.

The aforementioned embodiment of the invention can be used in other applications that may infer and/or deduce information related to a vehicle and its operation from lane lines. For example, the adaptive auto aim functionality can be used in other vehicle-based applications such as a lane departure warning system (LDW), wherein the position of the vehicle is compared to the detected locations of the lane lines. The LDW system than makes a determination such that a vehicle crossing a lane line unexpectedly can issue a warning to the driver so they can correct the maneuver, if it were unintentional. Further, an adaptive lane line detection algorithm can also be used to detect lane lines from the side or rear of the vehicle to deduce information concerning the location and behavior of other vehicles in the vicinity of the camera. Such an application could be used for monitor a blind-zone or spot of the vehicle.

Camera aim functionality is a general requirement for all vehicular vision systems. Those skilled in the art will further recognize that the embodiments as described herein regarding lane detection are not restricted to a specific implementation (e.g. in an FPGA), but can also embody a more general microprocessor approach. In such an embodiments, pixel values from at least one image is divided into a plurality of cells. These cells define a series of sub-windows within the original image. These individual cells are subsequently analyzed to identify lane markers within each cell. Features extracted from the individual cells are then reassembled in a road model. An advantage in utilizing "cells" is to account for variations in the roadway scene due to, for example, shadows cast on the roadway from buildings, trees, bridges and the like. Additionally, variations in pavement and/or road surfaces within a given image can be better processed.

In the alternative embodiment of the invention, at least one expected line width shall be utilized in determining whether a given "feature" is actually a lane line of interest or non-lane line noise. For example, an expected line width may be compared to an actual line width at a given distance from the controlled vehicle and the algorithm will perform a specific subroutine of subroutines based upon the difference from the expected width compared to the actual width. In at least one embodiment an image sensor assembly is configured such that an expected line width at approximately ten (10) meters from the controlled vehicle is approximately four pixels wide. It will be understood by those skilled in the art that from three to four pixels wide at approximately ten meters is preferred since the expected lane line width is greater than one pixel at twenty-five meters. The width of the line may be determined as described elsewhere herein.

As an example in accordance with the present invention, an image may be divided into a series of three-by-three (3×3) cells. It will be understood by those skilled in the art that an image may alternatively be divided into two columns, two rows, four columns, four rows and/or any sub-combination thereof or combination thereof. More cells may be also with the spirit and scope of the present invention. Whether a complete image or a cell is being analyzed, in at least one embodiment the analysis begins by computing a running average of at least two pixel values across a given row. This works to eliminate localized points of inflection in the pursuing analysis. In at least one embodiment, any pixel values in the given row below an overall row average are assigned a value equal to the row average. This procedure reduces the contrast in the resulting data. Further, a first derivative is computed across the row. Subsequent to computing the first derivative, in at least one embodiment a group of first derivative values are utilized to compute an average and/or a middle range. The smoothed first derivative data is then utilized to compute a second derivative. Thereafter, the second derivative data is utilized to identify lane markers by identifying associated rising and falling edges. Thus, this analysis is employed to accurately detect lane markers on wet roadway surfaces, roadway surfaces partially illuminated from other cars and/or roadway lighting.

When a group of pixels in a given row or data are determined to be indicative of a "wide" bright spot, for example more than what would be expected for a lane marker, the data associated with a column defined by the wide bright spot is ignored in the analysis. Thus, the method of the present invention is particularly well suited for dealing with illumination from oncoming vehicles at night or during dark, rainy, conditions. A series of images are analyzed to detect lane markers. If a lane marker is determined to be present in one image and again in the next image, a counter is incremented. If a lane marker is not detected in a subsequent image the counter is decremented. Once the counter reaches a predetermined threshold number, the presence of a lane marker is determined to be verified. This analysis provides a higher degree of certainty as to detection of lane markings.

In at least another embodiment raw data from an image is first averaged and pixel values below the average are assigned the average value. Subsequently a first derivative is calculated. A thresholding function utilizing a histogram of this data is derived then weighted. Values in the histogram below 0.33 of the histogram are then disregarded and the values are assigned a zero value. A second derivative is then calculated. Finally, the points of inflection of the second derivative are utilized to interpolate zero crossing values. Further, for a given frame in the video sequence, each row is processed in such a way that the pixels are compared to four thresholds that were computed during the previous frame. When no prior lane line information is present, the algorithm is in an uninitialized state. Wherein, the current frame is processed as all other frames are in terms of adaptively determining the intensity and gradient thresholds, but lane locations are not saved. This initialization phase sacrifices an image frame, but allows for proper seed values to be determined for the left-half and right-half intensity and gradient threshold values.

An expected lane line pixel width, an expected lane line, a sub-combination thereof or a combination thereof are utilized to fix a position of a given feature relative the position of a controlled vehicle. It should be understood that a given feature's characterization as being a lane line may be inferred from geographical dependent expected data. Such as, for example, having a lookup table of lane line widths dependent upon geographical data automatically selected based upon a geographical positioning system (GPS) incorporated into the controlled vehicle. It should be apparent that lane width for inference of a second feature based upon finding a first may also be stored in a geographically dependent lookup table. It should also be understood that road dependent systems, such as magnets, or magnetic material, strategically placed periodically along a roadway may be incorporated as they become more available. As GPS data becomes more precise and reliable that information may be used in combination with geographically dependent empirical data regarding the environment in which the controlled vehicle is traveling. The geographically dependent and visually dependent systems may be configured to enhance performance of the individually employed technologies.

In at least one other embodiment, an additional feature not identified in a given image or given images, may be inferred from an expected feature given the fact that at least one other feature was found in a given image or a recent preceding image. In at least one embodiment the system is configured such that lane lines are expected to be a predetermined distance from one another, therefore, position of a second lane line may be inferred from detection of the position of a first. Many nuisance situations such as at least partially snow covered roads, at least partially wet roads, at least partially shaded roads, road markings aside from lane lines, tar strips, skid marks of other tires, painted arrows and the like in the road and construction markings may be expected. In at least one embodiment, various expected "feature characteristics" are utilized to distinguish actual lane lines from nuisances. Many of the techniques taught herein are valuable for that purpose.

It should be understood that the above description and the accompanying figures are for illustrative purposes and should in no way be construed as limiting the invention to the particular embodiments shown and described. The appending claims shall be construed to include all equivalents within the scope of the doctrine of equivalents and applicable patent laws and rules.

What is claimed is:

1. A vehicular imaging system comprising:
at least one image sensor;
at least one processor configured to receive at least a portion of at least one image from the at least one image sensor such that a dynamic aim of the at least one image sensor is configured as a function of a lane marker detected from at least one threshold in the at least one image;
wherein the at least one processor is further configured to generate at least one vehicle equipment control signal as a function of the lane marker; and
wherein the dynamic aim is operable to correct an aim of the at least one image sensor relative to the lane marker detected in the at least one image.

2. The vehicular imaging system as in claim 1, wherein the at least one threshold is an intensity threshold.

3. The vehicular imaging system as in claim 1, wherein the at least one threshold is a gradient threshold.

4. The vehicular imaging system as in claim 1, wherein pixels in the at least one image are compared to the thresholds for determining lane line edge location.

5. The vehicular imaging system as in claim 1, wherein the at least one processor is a field programmable gate array (FPGA) for calculating a gradient approximation of at least one pixel in the at least one image and comparing the at least one pixel and the gradient approximation to the at least one threshold.

6. The vehicular imaging system as in claim 1, wherein lane line points used in determining a lane marker are processed using a linear model for determining a vanishing point in an image.

7. The vehicular imaging system as in claim 1, wherein the thresholds adaptively change based on environmental lighting conditions.

8. The vehicular imaging system as in claim 1, wherein the threshold is adaptively changed based on road surface conditions.

9. The vehicular imaging system as in claim 1, wherein a left portion of the at least one image and the right portion of the at least one image are separately processed.

10. The vehicular imaging system as in claim 1, wherein the dynamic aim of the at least one image sensor is configured such that an adaptive lane edge detection is used for establishing a position of a center of a road captured in the at least one image.

11. The vehicular imaging system as in claim 1, wherein the system is one from the group of: a headlight control system, a lane departure warning system (LDW), an object detection system and a blind zone detection system.

12. A vehicular vision system, comprising:
at least one image sensor;
  at least one processor configured to receive at least a portion of at least one image from the at least one image sensor such that a dynamic aim of a field of view of the at least one image sensor is adjusted as a function of at least one object detected by the at least one image sensor;
  wherein the object is at least one lane marker detected by comparing at least one pixel from the at least one image sensor to a plurality of adaptive thresholds; and
  wherein the dynamic aim of the field of view of the at least one image sensor is applied to calibrate a position of the at least one object in the at least one image.

13. The vehicular vision system as in claim 12, wherein the plurality of adaptive thresholds are based upon intensity and gradient of the at least one pixel from the at least one image sensor.

14. The vehicular vision system as in claim 12, wherein the at least one processor is a field programmable gate array (FPGA) for calculating a gradient approximation of at least one pixel in the at least one image and comparing the at least one pixel and the gradient approximation to the plurality of adaptive thresholds.

15. The vehicular vision system as in claim 12, wherein lane line points used in determining the at least one lane marker are processed using a linear model for determining a vanishing point in the at least one image.

16. The vehicular vision system as in claim 12, wherein the adaptive thresholds are changed based on at least one of current lighting conditions and current road conditions.

17. The vehicular vision system as in claim 12, wherein a left portion of the at least one image and the right portion of the at least one image are processed separately for determining lane edge location.

18. The vehicular vision system as in claim 12, wherein the dynamic aim of the at least one image sensor is configured such that an adaptive lane edge detection is used for establishing a position of a center of a road captured in the at least one image.

19. The vehicular vision system as in claim 12, wherein the system is one from the group of: a headlight control system, a lane departure warning system (LDW), an object detection system and a blind zone detection system.

20. The vehicular imaging system as in claim 1, wherein the dynamic aim of the at least one image sensor is corrected relative to a position of the lane marker in the at least one image.

21. A vehicular imaging system comprising:
at least one image sensor;
  at least one processor configured to receive at least a portion of at least one image from the at least one image sensor such that a dynamic aim of the at least one image sensor is configured as a function of a lane marker detected from at least one threshold in the at least one image;
  wherein the at least one processor is further configured to generate at least one vehicle equipment control signal as a function of the lane marker; and
  wherein the dynamic aim of the at least one image sensor is corrected relative to a position of the lane marker in the at least one image.

* * * * *